(12) United States Patent
Cheong et al.

(10) Patent No.: US 8,634,043 B2
(45) Date of Patent: Jan. 21, 2014

(54) REFLECTIVE AND TRANSPARENT LIQUID CRYSTAL DISPLAY DEVICE

(75) Inventors: Byoung Ho Cheong, Yongin-si (KR); Jae-Ho You, Gwangmyeong-si (KR); Soon-Joon Rho, Suwon-si (KR); Jae-Chang Kim, Busan (KR); Tae-Hoon Yoon, Busan (KR); Ki-Han Kim, Changwon-si (KR); Hye-Jung Jin, Busan (KR)

(73) Assignees: Samsung Display Co., Ltd. (KR); Pusan National University Industry-University Cooperation Foundation (KR)

( * ) Notice: Subject to any disclaimer, the term of this patent is extended or adjusted under 35 U.S.C. 154(b) by 100 days.

(21) Appl. No.: 13/286,403

(22) Filed: Nov. 1, 2011

(65) Prior Publication Data

US 2012/0194763 A1   Aug. 2, 2012

(30) Foreign Application Priority Data

Feb. 1, 2011   (KR) .......................... 10-2011-0010214

(51) Int. Cl.
  *G02F 1/1347*   (2006.01)
(52) U.S. Cl.
  USPC .................. 349/74; 349/62; 349/96; 349/144
(58) Field of Classification Search
  USPC ........................................ 349/74, 62, 96, 144
  See application file for complete search history.

(56) References Cited

U.S. PATENT DOCUMENTS

| 5,686,979 | A | 11/1997 | Weber et al. | |
|---|---|---|---|---|
| 6,025,897 | A * | 2/2000 | Weber et al. | 349/96 |
| 8,289,475 | B2 * | 10/2012 | Arai et al. | 349/62 |
| 8,390,750 | B2 * | 3/2013 | Ono | 349/37 |
| 2004/0095541 | A1 * | 5/2004 | Takeichi et al. | 349/139 |
| 2007/0263150 | A1 * | 11/2007 | Ohishi et al. | 349/128 |
| 2010/0177030 | A1 * | 7/2010 | Kuromizu | 345/102 |

FOREIGN PATENT DOCUMENTS

| JP | 2004-069835 A | 3/2004 |
|---|---|---|
| JP | 2004-117750 A | 4/2004 |
| JP | 2004-163583 A | 6/2004 |
| JP | 2007-219172 A | 8/2007 |

(Continued)

OTHER PUBLICATIONS

"High Performance Reflective and Transflective Displays Using Guest-Host Liquid Crystal Gels" SID Tech. Digest 37, 780-782 (2006).

(Continued)

*Primary Examiner* — Edward Glick
*Assistant Examiner* — Sang V Nguyen
(74) *Attorney, Agent, or Firm* — Cantor Colburn LLP

(57) ABSTRACT

A transflective liquid crystal display includes a liquid crystal panel including a first substrate, a second substrate, a liquid crystal layer, the first and second substrates arranged to face each other and the liquid crystal layer between the first and second substrates, a reflection polarizer and an absorption polarizer at opposing outer sides of the liquid crystal panel, and a backlight unit at an outer side of the liquid crystal panel and supplying light to the inside of the liquid crystal panel. A reflective axis of the reflection polarizer is parallel with a transmissive axis of the absorption polarizer, the transmissive axis of the reflection polarizer perpendicularly crosses the transmissive axis of the absorption polarize, and the liquid crystal layer includes liquid crystal molecules and a dichroic dye.

22 Claims, 21 Drawing Sheets

(56) References Cited

FOREIGN PATENT DOCUMENTS

| JP | 2008-185810 | A | | 8/2008 | |
| --- | --- | --- | --- | --- | --- |
| KR | 10-2006-0035331 | | * | 4/2006 | ............ G02F 1/1335 |
| KR | 1020060035331 | A | | 4/2006 | |
| KR | 1020060078052 | A | | 7/2006 | |
| KR | 1020060134316 | A | | 12/2006 | |
| KR | 1020080108770 | A | | 12/2008 | |
| KR | 1020100000322 | A | | 1/2010 | |

OTHER PUBLICATIONS

"Reflective and transflective color LCDs with double polarizers," Maeda et al., Journal of the Society for Information Display, Jul. 1, 1999.

"Transflective Liquid Crystal Display with High Aperture Ratio unsing Electrophoresis Particles," Cheong et al., IMID 2009 Digest.

* cited by examiner ardına # REFLECTIVE AND TRANSPARENT LIQUID CRYSTAL DISPLAY DEVICE This application claims priority to Korean Patent Application No. 10-2011-0010214 filed on Feb. 1, 2011, and all the benefits accruing therefrom under 35 U.S.C. §119, the entire contents of which are incorporated herein by reference.

BACKGROUND OF THE INVENTION (a) Field of the Invention

The invention relates to a transflective liquid crystal display. More particularly, the invention relates to a transflective liquid crystal display that can improve reflectivity and transmittance, and prevent gray inversion in reflective and transmission modes during occurrence of a time difference in generation of external light.

(b) Description of the Related Art

A liquid crystal display as one of flat panel display devices that are widely used includes two display panels where field generating electrodes such as a pixel electrode and a common electrode are formed, and a liquid crystal layer interposed therebetween, and the liquid crystal display generates an electric field in the liquid crystal layer by voltages applied to the field generating electrodes to determine alignment of liquid crystal molecules of the liquid crystal layer and control polarization of incident light, thereby displaying an image.

Such a liquid crystal display is classified as a reflective liquid crystal display and a transmissive liquid crystal display according to a light source.

The transmissive liquid crystal display has a structure in which a panel maintains liquid crystals that function as electro-optical switches between a pair of substrates, a backlight is disposed as a light source at the back surface of the panel, and an image can be viewed from the front of the panel. The use of the backlight is essential in a backlit liquid crystal display, but the backlight consumes a large amount of power so that the transmissive liquid crystal display is inappropriate to be used as a display of a portable device.

The reflective liquid crystal display has a structure in which a reflective plate is disposed at a bottom surface of a panel and light entering from the front is used as reflective light so that an image can be viewed from the front. Unlike the transmissive liquid crystal display, the reflective liquid crystal display is appropriate to be used as a display of a portable device because it does not require a backlight supplying light from the bottom, and thus consumes less power. However, the reflective liquid crystal display has spatial and temporal limitations because the optical effect of the reflective liquid crystal depends on the peripheral environment.

In order to overcome the drawbacks of the reflective and transmissive liquid crystal displays, a transflective liquid crystal display has been proposed. The transflective liquid crystal display can assure excellent optical characteristics without spatial and temporal limitations so that it has been applied to a mobile display.

However, a technique for realizing a complex mode in a single cell gap and a technique for applying a dual cell gap to a single mode have complex process problems and one pixel is divided into a transmission area and a reflection area so that the aperture ratio may be decreased, thereby causing deterioration of optical characteristics of the display.

Thus, a transflective liquid crystal display that can realize a reflection mode using external light and a transmission mode using a backlight unit in one pixel instead of dividing the pixel into the transmission area and the reflection area has been activated studied.

However, such a transflective liquid crystal display includes two liquid crystal panels so that reflectivity and transmittance may be deteriorated, and a time difference may occur when external light passes through the two liquid crystal layers.

In addition, when such a transflective liquid crystal display is realized using one liquid crystal panel, external light enters when a black gray of a transmission mode is expressed, and in this case, the gray becomes a white gray in a reflection mode due to the external light so that a desired gray cannot be expressed.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

The invention provides a transflective liquid crystal display that can improve reflectivity and transmittance and prevent occurrence of a time difference in external light.

Further, the invention provides a transflective liquid crystal display that can prevent gray inversion between a reflection mode and a transmission mode.

An exemplary embodiment of a transflective liquid crystal display according to the invention includes a liquid crystal panel including a first substrate, a second substrate, and a liquid crystal layer, the first and second substrates arranged to face each other and the liquid crystal layer between the first and second substrates, a reflection polarizer and an absorption polarizer at opposing sides of the liquid crystal panel, and a backlight unit at an outer side of the liquid crystal panel and supplying light to the inside of the liquid crystal panel. A reflective axis of the reflection polarizer is parallel with a transmissive axis of the absorption polarizer, the transmissive axis of the reflection polarizer is perpendicular to the transmissive axis of the absorption polarizer, and the liquid crystal layer includes liquid crystal molecules and a dichroic dye.

In an exemplary embodiment, the liquid crystal panel includes a plurality of pixels, and may further include a first pixel electrode in a pixel on the first substrate, a second pixel electrode in a pixel on the second substrate, and a common electrode on the first substrate.

In an exemplary embodiment, the liquid crystal layer may be arranged in a direction that is parallel with the reflective axis of the reflection polarizer.

In an exemplary embodiment, when a vertical electric field is formed between the second pixel electrode and the common electrode in a reflection mode, light having entered from an outside of the liquid crystal panel may be reflected by the reflection polarizer and then transmitted through the absorption polarizer to the outside of the liquid crystal panel.

In an exemplary embodiment, when a horizontal electric field is formed between the first pixel electrode and the common electrode in the transmission mode, light having entered from the backlight unit may be phase-delayed in the liquid crystal layer and then transmitted through the absorption polarizer to an outside of the liquid crystal panel.

In an exemplary embodiment, the liquid crystal layer may be arranged in a direction that is perpendicular to the reflection polarizer.

In an exemplary embodiment, when a horizontal electric field is formed between the first pixel electrode and the common electrode in a reflection mode, the liquid crystal layer is arranged in a direction that is parallel with the reflective axis of the reflection polarizer, and the dichroic dye may absorb light having entered from the outside of the liquid crystal panel.

In an exemplary embodiment, when a vertical electric field is formed between the second pixel electrode and the common electrode in the transmission mode, the liquid crystal layer is arranged in a direction that is parallel with the reflective axis of the reflection polarizer, and the absorption polarizer may absorb light having entered from the backlight unit.

In an exemplary embodiment, when a horizontal electric field is formed between the first pixel electrode and the common electrode and a vertical electric field is formed between the second pixel electrode and the common electrode in a transmission mode, light having entered from the backlight unit may be phase-delayed in the liquid crystal layer and then transmitted through the absorption polarizer to an outside of the liquid crystal panel.

In an exemplary embodiment, the liquid crystal layer may be arranged in a direction that is parallel with the reflective axis of the reflection polarizer in a portion adjacent to the first substrate, and may be arranged in a direction that is perpendicular to the reflective polarizer at a portion adjacent to the second substrate.

In an exemplary embodiment, when a vertical electric field is formed between the second pixel electrode and the common electrode in a reflection mode, light having entered from an outside of the liquid crystal panel may be reflected by the reflection polarizer and then transmitted through the absorption polarizer to the outside of the liquid crystal panel.

In an exemplary embodiment, when a horizontal electric field is formed between the first pixel electrode and the common electrode in a transmission mode, light having entered from the backlight unit may be phase-delayed in the liquid crystal layer and then transmitted through the absorption polarizer to an outside of the liquid crystal panel.

In an exemplary embodiment, the transflective liquid crystal display may further include first gate lines and first data lines on the first substrate, a first thin film transistor connected to the first gate line and the first data line, second gate lines and second data lines on the second substrate, and a second thin film transistor connected to the second gate line and the second data line. The first pixel electrode may be connected to the first thin film transistor, and the second pixel electrode may be connected to the second thin film transistor.

In an exemplary embodiment, the transflective liquid crystal display further includes an auxiliary liquid crystal panel including third and fourth substrates arranged to face each other, and an auxiliary crystal display panel between the third and fourth substrates. The reflection polarizer may be disposed between the liquid crystal panel and the auxiliary liquid crystal panel, and the absorption polarizer may be disposed between the auxiliary liquid crystal panel and the backlight unit.

In an exemplary embodiment, the liquid crystal panel and the auxiliary liquid crystal panel respectively include a plurality of pixels, and may further include a first pixel electrode in a pixel on the first substrate, a first common electrode on the second substrate, a second pixel electrode in a pixel on the third substrate, and a second common electrode on the fourth substrate.

In an exemplary embodiment, the liquid crystal layer may be arranged in a direction that is perpendicular to the reflection polarizer, and the auxiliary liquid crystal layer may be arranged in a direction that is parallel with the reflection polarizer.

In an exemplary embodiment, when a vertical electric field is formed between the first pixel electrode and the first common electrode in a reflection mode, the liquid crystal layer may be arranged in a direction that is parallel with the reflective axis of the reflection polarizer, and the dichroic dye may absorb light having entered from an outside of the liquid crystal panel.

In an exemplary embodiment, when a vertical electric field is formed between the first pixel electrode and the first common electrode in a transmission mode, light having entered from the backlight unit may be reflected by the reflection polarizer.

In an exemplary embodiment, when a vertical electric field is formed between the second pixel electrode and the second common electrode in a transmission mode, light having entered from the backlight unit may be phase-delayed in the auxiliary liquid crystal layer and then transmitted through the reflection polarizer to an outside of the liquid crystal panel.

In an exemplary embodiment, the liquid crystal layer may be arranged in a direction that is parallel with the reflective axis of the reflection polarizer, and the auxiliary liquid crystal layer may be arranged in a direction that is parallel with the reflection polarizer.

In an exemplary embodiment, when a vertical electric field is formed between the first pixel electrode and the first common electrode in the reflection mode, light having entered from an outside of the liquid crystal panel may be reflected by the reflection polarizer and then transmitted to the outside of the liquid crystal panel.

In an exemplary embodiment, when a vertical electric field is formed between the first pixel electrode and the first common electrode in a transmission mode and a vertical electric field is formed between the second pixel electrode and the second common electrode, light having entered from the backlight unit may be phase-delayed in the auxiliary liquid crystal layer and then transmitted through the reflection polarizer to the outside of the liquid crystal panel.

In an exemplary embodiment, the transflective liquid crystal display may further include first gate lines and first data lines on the first substrate, a first thin film transistor connected to the first gate line and the first data line, second gate lines and second data lines on the third substrate, and a second thin film transistor connected to the second gate line and the second data line. The first pixel electrode may be connected to the first thin film transistor. and the second pixel electrode may be connected to the second thin film transistor.

The exemplary embodiments of the transflective liquid crystal display described above has the following effects.

Exemplary embodiments of the transflective liquid crystal display according to the invention can realize a reflection mode and a transmission mode with one liquid crystal panel so that reflectivity and transmittance can be further improved compared to a conventional liquid crystal display that realizes a reflection mode and a transmission mode with two liquid crystal panels, and can reduce or effectively prevent a time difference from occurring when external light passes through two liquid crystal layers.

In addition, exemplary embodiments of the transflective liquid crystal display according to the invention realizes both the reflection mode and the transmission mode using one liquid crystal panel including a dichroic dye that can absorb external light so that gray inversion between the reflection mode and the transmission mode can be reduced or effectively prevented compared to a conventional case in which the reflection mode and the transmission mode are realized using two liquid crystal panels.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

Figure 1:
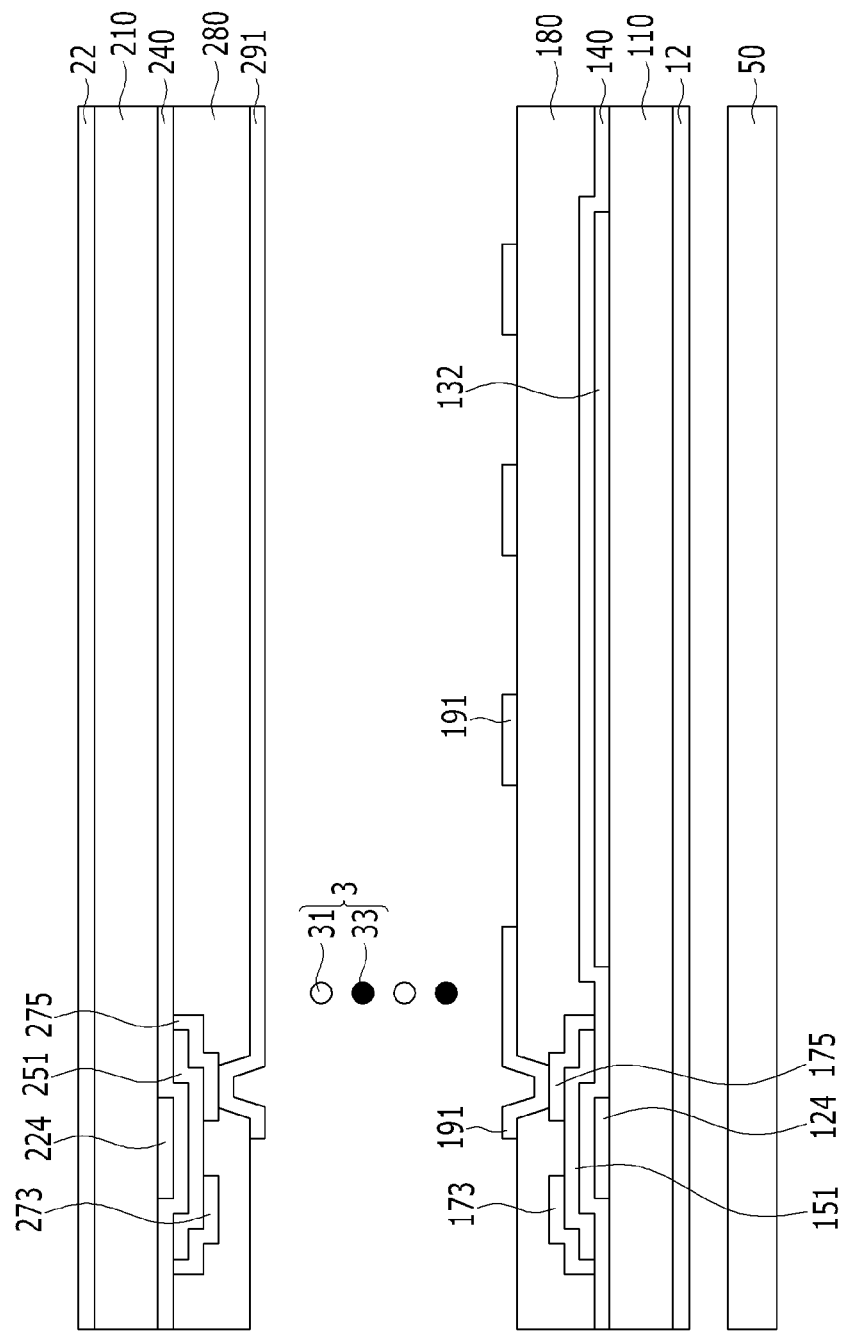
FIG. 1 is a cross-sectional view of an exemplary embodiment of a transflective liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

An exemplary embodiment of a transflective liquid crystal display according to the invention will now be described with reference to the accompanying drawings.

FIG. 1 is a cross-sectional view of an exemplary embodiment of a transflective liquid crystal display according to the invention.

The transflective liquid crystal display includes a liquid crystal panel including a lower panel including a first substrate 110, an upper panel including a second substrate 210, and a liquid crystal layer 3 between the lower and upper panels. The first and second substrates 110 and 210 are arranged to face each other.

Although it is not illustrated, first gate lines, first data lines, and a first thin film transistor connected to the first gate lines and the first data lines are on the first substrate 110. In one exemplary embodiment, the first gate lines and the first data lines cross each other and define a plurality of pixels, but the invention is not limited thereto. The first thin film transistor includes a first gate electrode 124 on the first substrate 110, a first gate insulating layer 140 on the first gate electrode 124, a first semiconductor layer 151 on the first gate insulating layer 140, a first source electrode 173, and a first drain electrode 175. The first source electrode 173 and the first drain electrode 175 are at a distance from each other on the first semiconductor 151, and form a channel therebetween.

A first passivation layer 180 is on the first source electrode 173 and the first drain electrode 175, and a first pixel electrode 191 is in a pixel and on the first passivation layer 180. A common electrode 132 is in a pixel under the first pixel electrode 191. The first pixel electrode 191 is in the shape of a plurality of bars connected to each other, and a horizontal electric field may be formed between the first pixel electrode 191 and the common electrode 132. As used herein, a bar indicates an elongated shape, having a length substantially greater than a width.

Although it is not illustrated, second gate lines, second data lines, and a second thin film transistor connected to the second gate lines and the second data lines are on the second substrate 210. In one exemplary embodiment, the second gate lines and the second data lines cross each other, defining a plurality of pixels, but the invention is not limited thereto. The second thin film transistor includes a second gate electrode 224 on the second substrate 210, a second gate insulating layer 240 on the second gate electrode 224, a second semiconductor layer 251 on the second gate insulating layer 240, a second source electrode 273, and a second drain electrode 275. The second source electrode 273 and the second drain electrode 275 are at a distance from each other on the second semiconductor layer 251, and form a channel therebetween.

A second passivation layer 280 is on the second source electrode 273 and the second drain electrode 275, and a second pixel electrode 291 is in a pixel and on the second passivation layer 280. A vertical electric field may be formed between the second pixel electrode 291 and the common electrode 132.

The liquid crystal layer 3 includes a mixture of a plurality of liquid crystal molecules 31 and a dichroic dye 33. In this case, the liquid crystal layer 3 is arranged in a direction parallel with the first substrate 110 and the second substrate 210.

A reflection polarizer 12 and an absorption polarizer 22 are on outer sides of the liquid crystal panel. In further detail, the reflection polarizer 12 may be attached to an outer side of the lower panel including the first substrate 110, and the absorption polarizer 22 may be attached to an outer side of the upper panel including the second substrate 210.

A backlight unit 50 is at the outer side of the liquid crystal panel, that is, the outer side of the lower panel including the first substrate 110. The backlight unit 50 is classified as a direct backlight type or a side backlight type according to alignment of a light source. The direct type is one in which a lamp disposed under and overlapping the liquid crystal panel directly irradiates light to the liquid crystal panel, and the side type is one in which light is irradiated to the liquid crystal panel through a light guiding plate. The backlight unit 50 according to the invention may adopt either of the two types. The backlight unit 50 supplies light to the inner side of the liquid crystal panel, and the supplied light is transmitted to the outer side of the liquid crystal panel, that is, the outer side of the upper panel including the second substrate 210, such that an image is displayed on a screen of the liquid crystal panel.

Mechanisms for expressing a black gray and a white gray in a reflection mode and a transmission mode of the transflective liquid crystal display of FIG. 1 will be respectively described.

Figure 2:
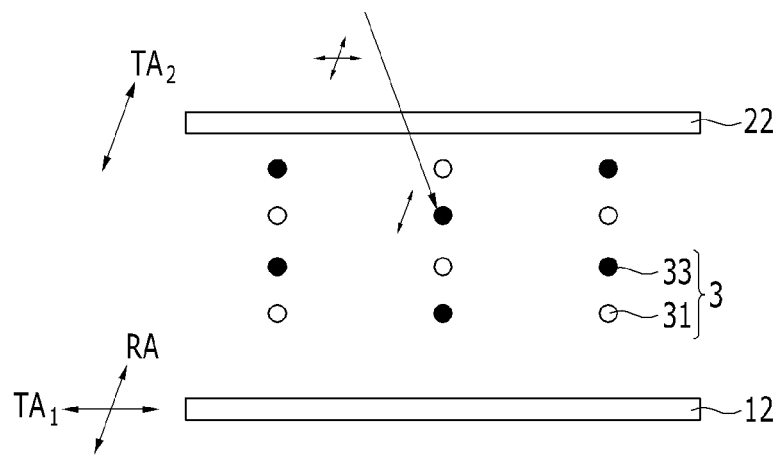
FIG. 2 and FIG. 3 show a driving mechanism of a reflection mode of the transflective liquid crystal display of FIG. 1.
Figure 3:
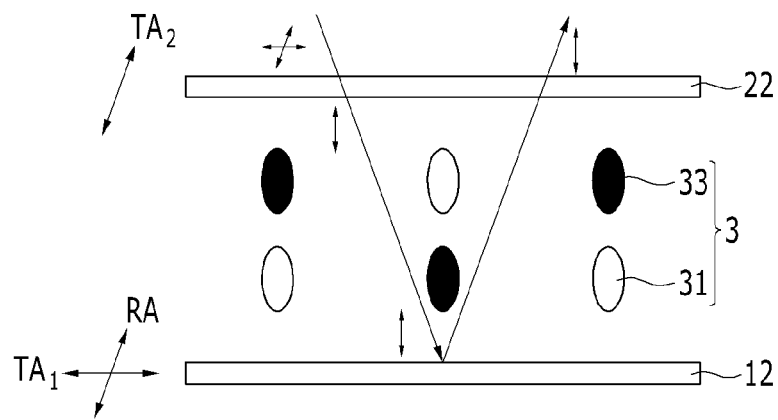
Figure 4:
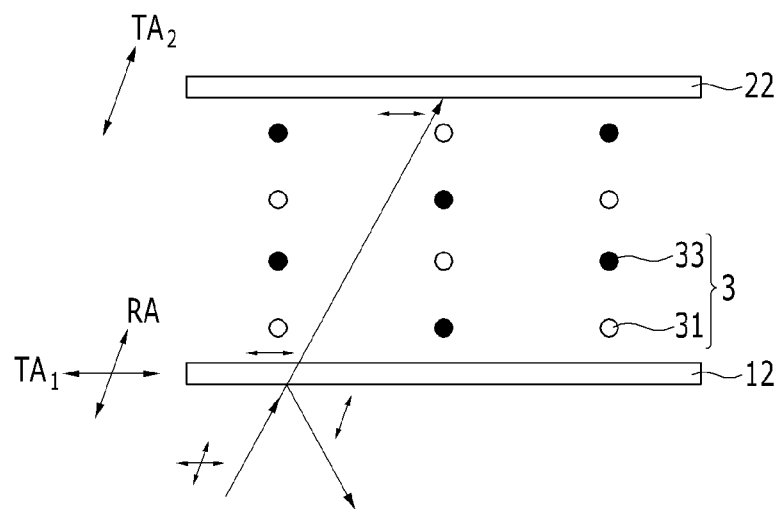
FIG. 4 and FIG. 5 show a driving mechanism of a transmission mode of the transflective liquid crystal display of FIG. 1.
Figure 5:
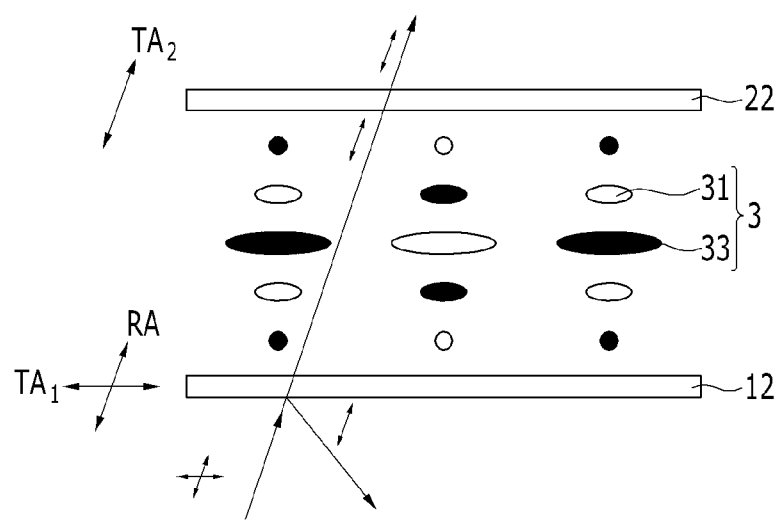

FIG. 2 and FIG. 3 show a driving mechanism of the reflection mode of the transflective liquid crystal display of FIG. 1, and FIG. 4 and FIG. 5 show a driving mechanism of the transmission mode of the transflective liquid crystal display of FIG. 1.

The reflection polarizer 12 of the transflective liquid crystal display of FIG. 1 has a reflective axis RA reflecting light that vibrates in a first direction, and a transmissive axis $TA_1$ transmitting light that vibrates in a second direction that is substantially perpendicular to the first direction. The absorption polarizer 22 has a transmissive axis $TA_2$ that transmits light vibrating in the first direction. Thus, the reflective axis RA of the reflection polarizer 12 is parallel with the transmissive axis $TA_2$ of the absorption polarizer 22, and the transmissive axis $TA_1$ of the reflection polarizer 12 is perpendicular to the transmissive axis $TA_2$ of the absorption polarizer 22.

The liquid crystal layer 3 is arranged in a direction that is parallel with the reflective axis RA of the reflection polarizer 12. Thus, when the light vibrating in the first direction enters into the liquid crystal layer 3, the light is absorbed by the dichroic dye 33.

Referring to FIG. 2, when light vibrating in the first and second directions enters from the outside in the reflection mode, only the light vibrating in the first direction that is parallel with the transmissive axis $TA_2$ of the absorption polarizer 22 is transmitted through the absorption polarizer 22, and the light vibrating in the second direction is absorbed by the absorption polarizer 22. In a state in which the electric field is not formed, the light having passed through the absorption polarizer 22 passes through the liquid crystal layer 3 without phase variation, and when the light enters into the liquid crystal layer 3, the light is absorbed by the dichroic dye 33 because it vibrates in the first direction. Thus, when the electric field is not formed in the reflection mode, a black gray can be expressed.

Referring to FIG. 3, in the reflection mode, when light vibrating in the first and second directions enters from the outside, only the light vibrating in the first direction that is parallel with the transmissive axis $TA_2$ of the absorption polarizer 22 passes through the absorption polarizer 22, and the light vibrating in the second direction is absorbed by the absorption polarizer 22. When a voltage is applied to the second pixel electrode 291 of FIG. 1 and the common electrode 132 of FIG. 1 and thus a vertical electric field is formed, the liquid crystal layer 3 is arranged in a direction that is perpendicular to the reflection polarizer 12 and the absorption polarizer 22. Thus, the light having passed through the absorption polarizer 22 can reach the reflection polarizer 12 without being absorbed by the dichroic dye 33.

Since the light reaching the reflection polarizer 12 vibrates in the first direction that is parallel with the reflective axis RA of the reflection polarizer 12, the light is reflected by the reflection polarizer 12 and thus reaches the absorption polarizer 22. Since the light reaching the absorption polarizer 22 vibrates in the first direction that is parallel with the transmissive axis $TA_2$ of the absorption polarizer 22, the light is transmitted to the outside of the liquid crystal panel through the absorption polarizer 22. Accordingly, when the vertical electric field is formed in the reflection mode, a white gray can be expressed.

Referring to FIG. 4, in the transmission mode, when light vibrating in the first and second directions enters from the backlight unit 50, only the light vibrating in the second direction parallel with the transmissive axis $TA_1$ of the reflection polarizer 12 is passed through the reflection polarizer 12, and the light vibrating in the first direction is reflected by the reflection polarizer 12. In the state in which the electric field is not formed, the light having passed through the reflection polarizer 12 can reach the absorption polarizer 22 without being absorbed by the dichroic dye 33. Since the light reaching the absorption polarizer 22 vibrates in the second direction that is perpendicular to the transmissive axis $TA_2$ of the absorption polarizer 22, the light is absorbed by the absorption polarizer 22. Thus, when the electric field is not formed in the transmission mode, the black gray can be expressed.

Light enters from the outside in the transmission mode and thus a gray of the reflection mode is also expressed. When the black gray is expressed in the transmission mode of the invention, the black gray is expressed in the reflection mode so that gray inversion can be reduced or effectively prevented.

Referring to FIG. 5, when light vibrating in the first and second directions enters from the backlight unit 50, only the light vibrating in the second direction that is parallel with the transmissive axis $TA_1$ of the reflection polarizer 12 is passed through the reflection polarizer 12, and the light vibrating in the first direction is reflected by the reflection polarizer 12. When a voltage is applied to the pixel electrode 191 of FIG. 1 and the common electrode 132 of FIG. 1 and a horizontal electric field is formed, the liquid crystal layer 3 rotates and the phase of the light having passed through the reflection polarizer 12 is changed 90 degrees when passing the liquid crystal layer 3. Therefore, light having passed through the liquid crystal layer 3 can reach the absorption polarizer 22 without being absorbed by the dichroic dye 33. Since the light reached the absorption polarizer 22 vibrates in the first direction that is parallel with the transmissive axis $TA_2$ of the absorption polarizer 22, the light is transmitted through the absorption polarizer 22 to the outside of the liquid crystal panel. Thus, when the horizontal electric field is formed in the transmission mode, a white gray can be expressed.

When the white gray of the transmission mode is expressed, the reflection mode also expresses a white mode so that gray inversion can be reduced or effectively prevented.

In the exemplary embodiment of the invention, when a black gray is expressed in the transmission mode, the reflection mode also expresses a black gray, and when a white gray is expressed in the transmission mode, the reflection mode also expresses a white gray. That is, when the transmission mode expresses a black gray, the black gray can be further clearly expressed by reducing or effectively preventing reflection of the light, and when the transmission mode expresses a white gray, the white gray can be further clearly expressed by controlling light entering from the outside to be reflected. The reason for this is that when the dichroic dye 33 is arranged in a direction perpendicular to the reflective axis RA of the reflection polarizer 12, light entering from the outside can reach the reflection polarizer 12 without being absorbed by the dichroic dye 33, but when the dichroic dye 33 is arranged in a direction parallel with the reflective axis RA of the reflection polarizer 12, the light cannot reach the reflection polarizer 12 and thus cannot be reflected to the outside because it is absorbed by the dichroic dye 33.

Transmittance and reflectivity of the transflective liquid crystal display of FIG. 1 will now be described.

Figure 6:
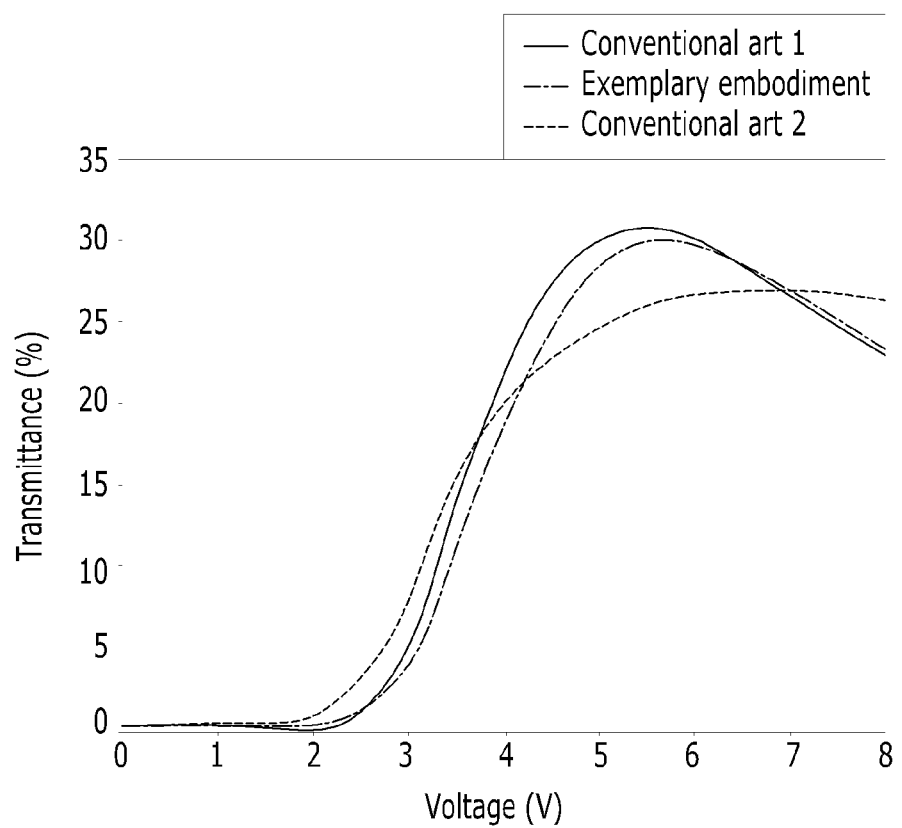
FIG. 6 is a graph showing transmittance according to a driving voltage of the transflective liquid crystal display of FIG. 1 in comparison with a liquid crystal display according to a prior art.
Figure 7:
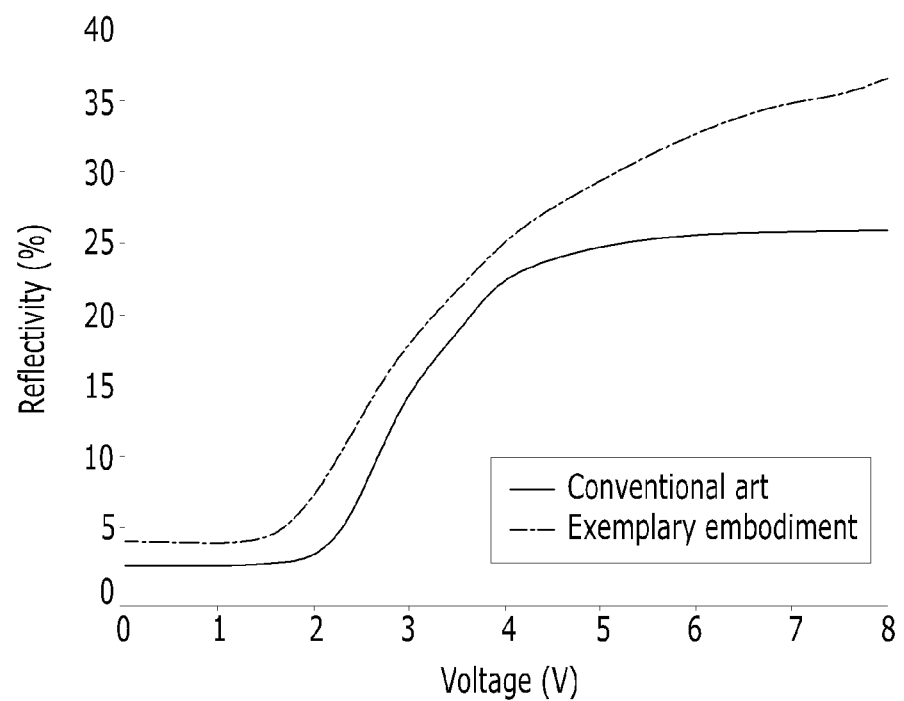
FIG. 7 is a graph showing reflectivity according to a driving voltage of the transflective liquid crystal display of FIG. 1 in comparison with the liquid crystal display according to the prior art.

FIG. 6 is a graph showing transmittance according to a driving voltage of the transflective liquid crystal display of FIG. 1 in comparison with a liquid crystal display according to a conventional art, and FIG. 7 is a graph showing reflectivity according to the driving voltage of the transflective liquid crystal display of FIG. 1 in comparison with the liquid crystal display according to the conventional art.

In FIG. 6, Conventional art 1 indicates a general backlit liquid crystal display, and transmittance is measured using a fringe field switching mode liquid crystal display, while Conventional art 2 indicates a transflective liquid crystal display formed of two conventional liquid crystal panels.

Referring to FIG. 6, a transmittance characteristic of the transflective liquid crystal display of the exemplary embodiment in FIG. 1 of the invention is similar to that of the general backlit liquid crystal display, and transmittance of the transflective liquid crystal display of the exemplary embodiment of FIG. 1 of the invention is higher than that of the transflective liquid crystal display formed of the two conventional liquid crystal panels.

In FIG. 7, "conventional art" implies the transflective liquid crystal display formed of the two conventional liquid crystal panels.

Referring to FIG. 7, the transflective liquid crystal display of the invention has higher reflectivity than a conventional transflective liquid crystal formed of two liquid crystal panels. In addition, a difference between reflectivity in the black gray and reflectivity in the white gray is increased so that the contrast ratio is also increased.

Another exemplary embodiment of a transflective liquid crystal display according to the invention will now be described with reference to the accompanying drawings.

Figure 8:
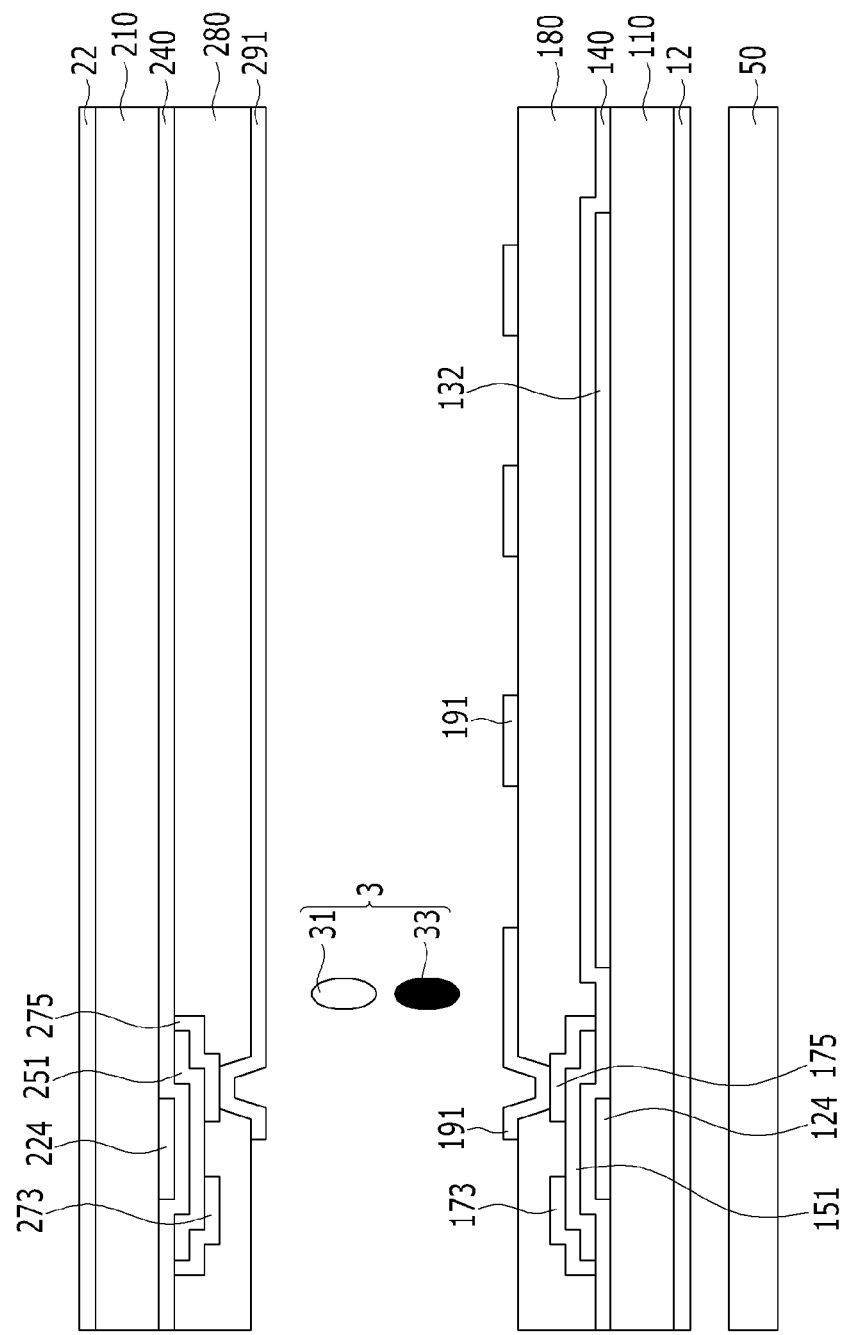
FIG. 8 is a cross-sectional view of another exemplary embodiment of a transflective liquid crystal display according to the invention.

FIG. 8 is a cross-sectional view of another exemplary embodiment of a transflective liquid crystal display according to the invention.

The transflective liquid crystal display of FIG. 8 is similar to the transflective liquid crystal display of FIG. 1, and therefore different parts from the exemplary embodiment of FIG. 1 will be described.

Like the transflective liquid crystal display of FIG. 1, the transflective liquid crystal display of FIG. 8 includes the liquid crystal panel including the lower panel including the first substrate 110, the upper panel including the second substrate 210, and the liquid crystal layer 3 between the lower and upper panels. The first and second substrates 110 and 210 are arranged to face each other.

However, the liquid crystal layer 3 of FIG. 1 is arranged in the horizontal direction, but the liquid crystal layer 3 of FIG. 8 is arranged in a direction that is perpendicular to the first and second substrates 110 and 210.

The reflection polarizer 12, the absorption polarizer 22, and the backlight unit 50 are the same as those in the first exemplary embodiment.

Mechanisms for expressing a black gray and a white gray in a reflection mode and a transmission mode of the transflective liquid crystal display of FIG. 8 will be respectively described.

Figure 9:
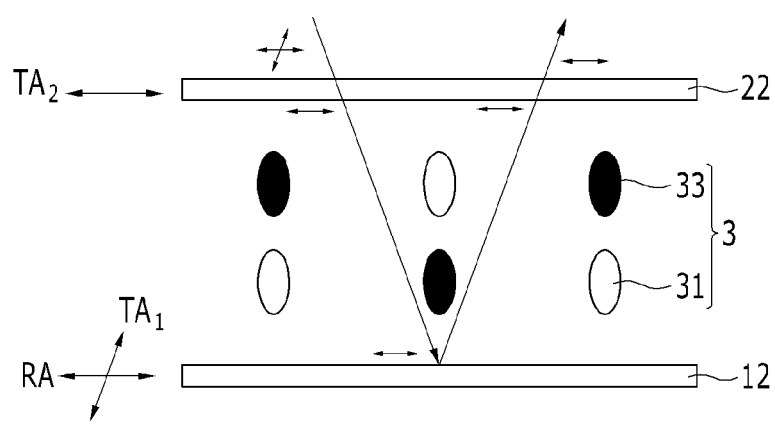
FIG. 9 and FIG. 10 show a driving mechanism of a reflection mode of the transflective liquid crystal display of FIG. 8.
Figure 10:
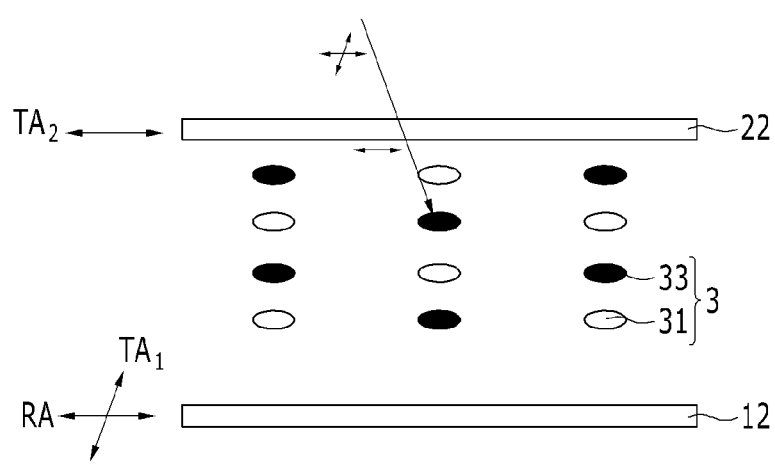
Figure 11:
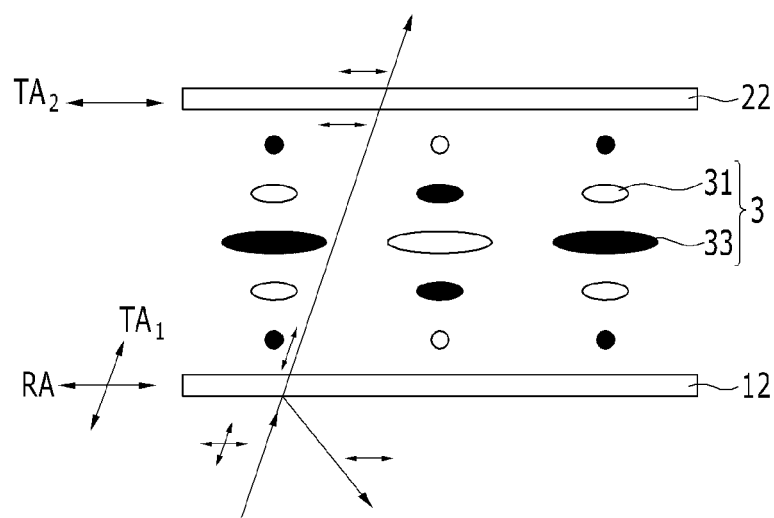
FIG. 11 and FIG. 12 show a driving mechanism of a transmission mode of the transflective liquid crystal display of FIG. 8.
Figure 12:
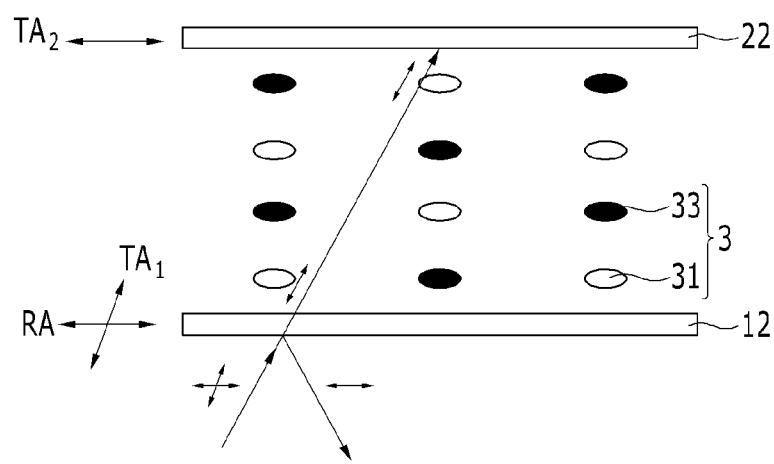

FIG. 9 and FIG. 10 show a driving mechanism of the reflection mode of the transflective liquid crystal display of FIG. 8, and FIG. 11 and FIG. 12 show a driving mechanism of the transmission mode of the transflective liquid crystal display of FIG. 8.

The reflection polarizer 12 of the transflective liquid crystal display of FIG. 8 has a transmissive axis $TA_1$ transmitting light that vibrates in a first direction and a reflective axis RA reflecting light that vibrates in a second direction that is substantially perpendicular to the first direction. The absorption polarizer 22 further has a transmissive axis $TA_2$ that transmits light vibrating in the second direction. Thus, the reflective axis RA of the reflection polarizer 12 is parallel with the transmissive axis $TA_2$ of the absorption polarizer 22, and the transmissive axis $TA_1$ of the reflection polarizer 12 is perpendicular to the transmissive axis $TA_2$ of the absorption polarizer 22.

Alignment of the liquid crystal layer 3 of the transflective liquid crystal display of FIG. 8 is different from that of the liquid crystal layer 3 of the transflective liquid crystal display of FIG. 1, and is arranged in a direction that is perpendicular to the reflection polarizer 12 and the absorption polarizer 22. Thus, although light vibrating in the first and second direction enter into the liquid crystal layer 3, the light is not absorbed by the dichroic dye 33.

Referring to FIG. 9, in the reflection mode, when light vibrating in the first and second directions enters from the outside, only the light vibrating in the second direction that is parallel with the transmissive axis $TA_2$ of the absorption polarizer 22 passes through the absorption polarizer 22, and the light vibrating in the first direction is absorbed by the absorption polarizer 22. In the state in which an electric field is not formed, the liquid crystal layer 3 is arranged in a direction that is perpendicular to the absorption polarizer 22, and the light having passed through the absorption polarizer 22 passes through the liquid crystal layer 3 without phase variation so that the light can reach the reflection polarizer 12 without being absorbed by the dichroic dye 33. Since the light having reached the reflection polarizer 12 vibrates in the second direction that is parallel with the reflective axis RA of the reflection polarizer 12, that light is reflected by the reflection polarizer 12 and then reaches the absorption polarizer 22. Since the light having reached the absorption polarizer 22 vibrates in the second direction that is parallel with the transmissive axis $TA_2$ of the absorption polarizer 22, the light is transmitted through the absorption polarizer 22 to the outside of the liquid crystal panel. Therefore, when no electric field is formed in the reflection mode, a white gray can be expressed.

Referring to FIG. 10, in the reflection mode, when light vibrating in the first and second directions enters from the outside, only the light vibrating in the second direction that is parallel with the transmissive axis $TA_2$ of the absorption polarizer 22 passes through the absorption polarizer 22, and the light vibrating in the first direction is absorbed by the absorption polarizer 22. When a voltage is applied to a second pixel electrode 291 of FIG. 8 and a common electrode 132 of FIG. 8 and thus a vertical electric field is formed, the liquid crystal layer 3 is arranged in a direction that is parallel with the reflective axis RA of the reflection polarizer 12. Since the light having passed through the absorption polarizer 22 passes into the liquid crystal layer 3 without phase variation and vibrates in the second direction, the light is absorbed by the dichroic dye 33 when entering into the liquid crystal layer 3. Therefore, when the vertical electric field is formed in the reflection mode, a black gray can be expressed.

Referring to FIG. 11, in the transmission mode, light vibrating in the first and second directions enters from the backlight unit 50, only the light vibrating in the first direction that is parallel with the transmissive axis $TA_1$ of the reflection polarizer 12 passes through the reflection polarizer 12 and the light vibrating in the second direction is reflected by the reflection polarizer 12. When a voltage is applied to the first pixel electrode 191 of FIG. 8 and the common electrode 132 of FIG. 8 and thus a horizontal electric field is formed, and simultaneously when the voltage is applied to the second pixel electrode 291 of FIG. 8 and the common electrode 132 of FIG. 8 and thus the vertical electric field is formed therebetween, the liquid crystal layer 3 rotates and the phase of the light having passed through the liquid crystal layer 3 is changed 90 degrees to be parallel with the reflective axis RA of the reflection polarizer 12. Therefore, the light having passed through the liquid crystal layer 3 can reach the absorption polarizer 22 without being absorbed by the dichroic dye 33. Since the light reaching the absorption polarizer 22 vibrates in the second direction that is parallel with the transmissive axis $TA_2$ of the absorption polarizer 22, the light is transmitted through the absorption polarizer 22 to the outside of the liquid crystal panel. Therefore, when the horizontal electric field and the vertical electric field are formed in the transmission mode, a white gray can be expressed.

Referring to FIG. 12, in the transmission mode, when light vibrating in the first and second directions enters from the backlight unit 50, only the light vibrating in the first direction that is parallel with the transmissive axis $TA_1$ of the reflection polarizer 12 passes through the reflection polarizer 12, and the light vibrating in the second direction is reflected by the reflection polarizer 12. When the voltage is applied to the second pixel electrode 291 of FIG. 8 and the common electrode 132 of FIG. 8 and the vertical electric field is formed, the liquid crystal layer 3 is arranged in a direction that is perpendicular parallel with the reflective axis RA of the reflection polarizer 12. The light having passed through the reflection polarizer 12 can reach the absorption polarizer 22 without being absorbed by the dichroic dye 33, and the light vibrates in the first direction that is perpendicular to the transmissive axis $TA_2$ of the absorption polarizer 22, and therefore the light is absorbed by the absorption polarizer 22. Therefore, when the vertical electric field is formed in the transmission mode, a black gray can be expressed.

When the black gray of the transmission mode is expressed, the reflection mode also expresses the black gray so that gray inversion can be reduced or effectively prevented.

Another exemplary embodiment of a transflective liquid crystal display according to the invention will now be described with reference to the accompanying drawings.

Figure 13:
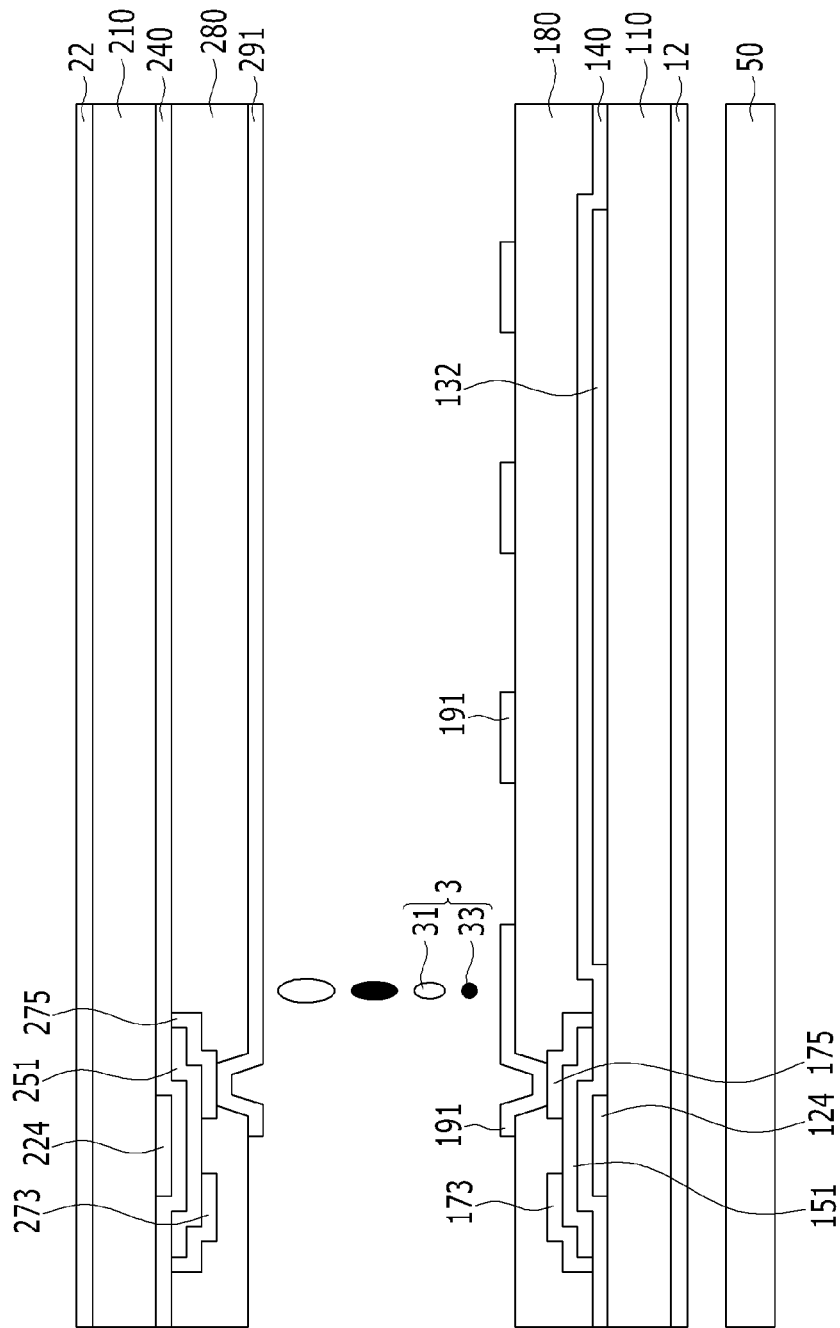
FIG. 13 is a cross-sectional view of another exemplary embodiment of a transflective liquid crystal display according to the invention.

FIG. 13 is a cross-sectional view of another exemplary embodiment of a transflective liquid crystal display according to the invention.

The transflective liquid crystal display of FIG. 13 is similar to the transflective liquid crystal display of FIG. 1, and therefore different parts from the exemplary embodiment of FIG. 1 will be described.

Like the transflective liquid crystal display of FIG. 1, the transflective liquid crystal display of FIG. 13 includes the liquid crystal panel including the lower panel including the first substrate 110, the upper panel including the second substrate 210, and the liquid crystal layer 3 between the lower and upper panels. The first and second substrates 110 and 210 are arranged to face each other.

The liquid crystal layer 3 of FIG. 1 is arranged in the horizontal direction, but the liquid crystal layer 3 of FIG. 13 is arranged in parallel with the first substrate 110 in a portion adjacent to the first substrate 110, and arranged in a direction perpendicular to the second substrate 210 in a portion adjacent to the second substrate 210.

The reflection polarizer 12, the absorption polarizer 22, and the backlight unit 50 are the same as those in the first exemplary embodiment.

Mechanisms for expressing a black gray and a white gray in a reflection mode and a transmission mode of the transflective liquid crystal display of FIG. 13 will be respectively described.

Figure 14:
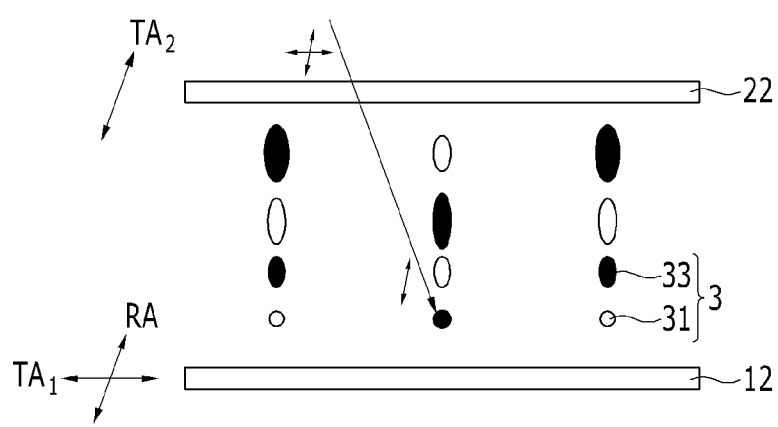
FIG. 14 and FIG. 15 show a driving mechanism of a reflection mode of the transflective liquid crystal display of FIG. 13.
Figure 15:
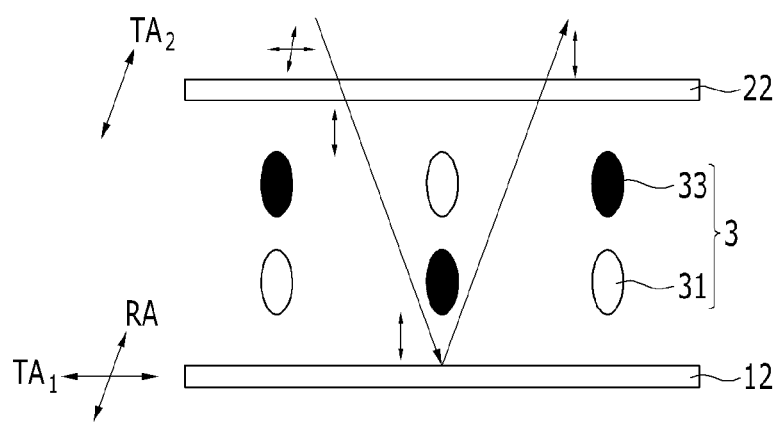
Figure 16:
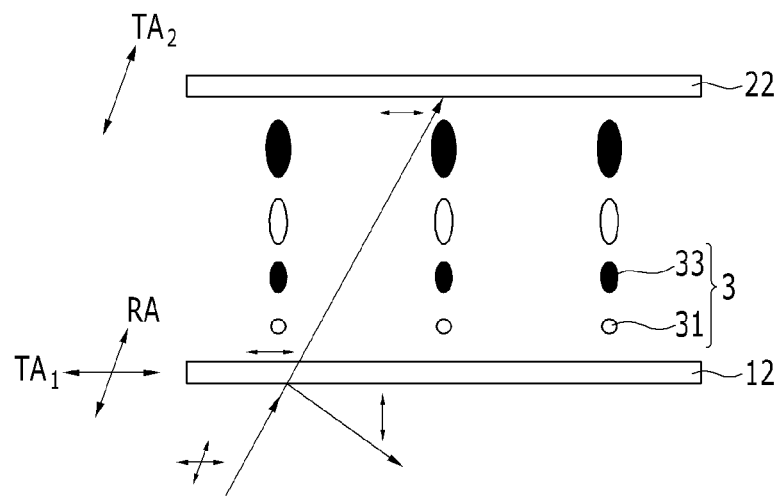
FIG. 16 and FIG. 17 show a driving mechanism of a transmission mode of the transflective liquid crystal display of FIG. 13.
Figure 17:
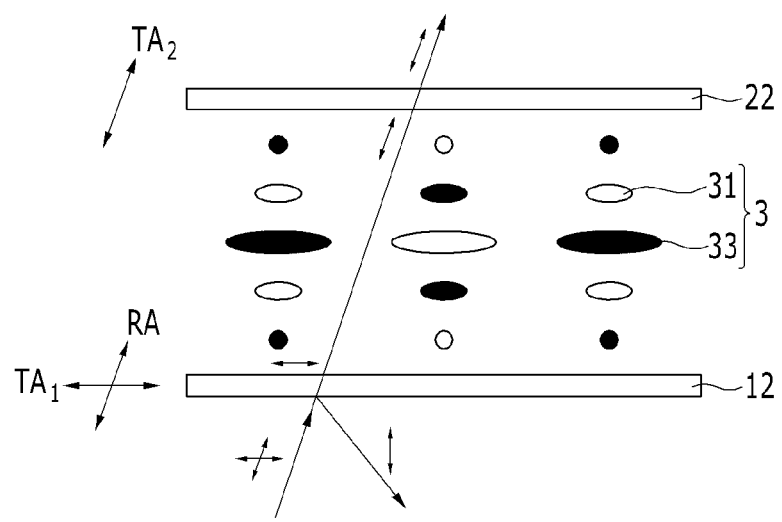

FIG. 14 and FIG. 15 show a driving mechanism of the reflection mode of the transflective liquid crystal display of FIG. 13, and FIG. 16 and FIG. 17 show a driving mechanism of the transmission mode of the transflective liquid crystal display of FIG. 13.

The reflection polarizer 12 of the transflective liquid crystal display of FIG. 13 has a reflective axis RA reflecting light that vibrates in a first direction, and a transmissive axis $TA_1$ transmitting light that vibrates in a second direction that is substantially perpendicular to the first direction. The absorption polarizer 22 further has a transmissive axis $TA_2$ that transmits light vibrating in the first direction. Thus, the reflective axis RA of the reflection polarizer 12 is parallel with the transmissive axis $TA_2$ of the absorption polarizer 22, and the transmissive axis $TA_1$ of the reflection polarizer 12 is perpendicular to the transmissive axis $TA_2$ of the absorption polarizer 22.

The liquid crystal layer 3 is arranged in parallel with the reflective axis RA of the reflection polarizer 12 in a portion adjacent to the first substrate 110 of FIG. 13. Therefore, when the light vibrating in the first direction enters into the liquid crystal layer 3, the light is absorbed by the dichroic dye 33. In addition, the liquid crystal layer 3 is arranged in a direction that is perpendicular to the reflection polarizer 12 in a portion adjacent to the second substrate 210 of FIG. 13.

Referring to FIG. 14, in the reflection mode, when light vibrating in the first and second directions enters from the outside, only the light vibrating in the first direction that is parallel with the transmissive axis $TA_2$ of the absorption polarizer 22 passes through the absorption polarizer 22, and the light vibrating in the second direction is absorbed by the absorption polarizer 22. In the state in which an electric field is not formed, the light having passed through the absorption polarizer 22 passes through the liquid crystal layer 3 without phase variation, and vibrates in the first direction, and thus when the light enters into the liquid crystal layer 3, the light is absorbed by the dichroic dye 33. Therefore, when no electric field is formed in the reflection mode, a black gray can be expressed.

Referring to FIG. 15, in the reflection mode, when light vibrating in the first and second directions enters from the outside, only the light vibrating in the first direction that is parallel with the transmissive axis $TA_2$ of the absorption polarizer 22 passes through the absorption polarizer 22, and the light vibrating in the second direction is absorbed by the absorption polarizer 22. When a voltage is applied to the second pixel electrode 291 of FIG. 13 and the common electrode 132 of FIG. 13 and thus a vertical electric field is formed, the liquid crystal layer 3 is arranged in a direction that is perpendicular to the reflection polarizer 12 and the absorption polarizer 22. Therefore, the light having passed through the absorption polarizer 22 can reach the reflection polarizer 12 without being absorbed by the dichroic dye 33. Since the light reaching the reflection polarizer 12 vibrates in the first direction that is parallel with the reflective axis RA of the reflection polarizer 12, the light is reflected by the reflection polarizer 12 and thus reaches the absorption polarizer 22. The light having reached the absorption polarizer 22 vibrates in the first direction that is parallel with the transmissive axis $TA_2$ of the absorption polarizer 22 so that the light is transmitted through the absorption polarizer 22 to the outside of the liquid crystal panel. Therefore, when the vertical electric field is formed in the reflection mode, a white gray can be expressed.

Referring to FIG. 16, in the transmission mode, when light vibrating in the first and second directions enters from the backlight unit 50, only light vibrating in the second direction that is parallel with the transmissive axis $TA_1$ of the reflection polarizer 12 passes through the reflection polarizer 12, and light vibrating in the first direction is reflected by the reflection polarizer 12. In the state in which no electric field is formed, the light having passed through the reflection polarizer 12 can reach the absorption polarizer 22 without being absorbed by the dichroic dye 33. Since the light has reached the absorption polarizer 22 vibrating in the second direction that is perpendicular to the transmissive axis $TA_2$ of the absorption polarizer 22, the light is absorbed by the absorption polarizer 22. Accordingly, when no electric field is formed in the transmission mode, a black gray can be expressed.

In the transmission mode, light enters from the outside, and accordingly, the gray of the reflection mode can also be expressed. In the transmission mode of the exemplary embodiment of the invention, the black gray is expressed in the reflection mode when expressing the black gray in the transmission mode so that gray inversion can be reduced or effectively prevented.

Referring to FIG. 17, when light vibrating in the first and second directions enters from the backlight unit 50, only light vibrating in the second direction that is parallel with the transmissive axis $TA_1$ of the reflection polarizer 12 passes through the reflection polarizer 12, and light vibrating in the first direction is reflected by the reflection polarizer 12. When a voltage is applied to the first pixel electrode 191 of FIG. 13 and the common electrode 132 of FIG. 13 and thus a horizontal electric field is formed, the liquid crystal layer 3 rotates and the phase of the light having passed through the reflection polarizer 12 is changed 90 degrees. Accordingly, light having passed through the liquid crystal layer 3 can reach the absorption polarizer 22 without being absorbed by the dichroic dye 33. The light having reached the absorption polarizer 22 vibrates in the first direction that is parallel with the transmissive axis $TA_2$ of the absorption polarizer 22, and therefore the light is expressed to the outside of the liquid crystal panel. Accordingly, when the horizontal electric field is formed in the transmission mode, a white gray can be expressed.

When expressing the white gray in the transmission mode, the white gray is also expressed in the reflection mode so that gray inversion can be reduced or effectively prevented.

Another transflective liquid crystal display according to a fourth exemplary embodiment of the invention will now be described with reference to the accompanying drawings.

Figure 18:
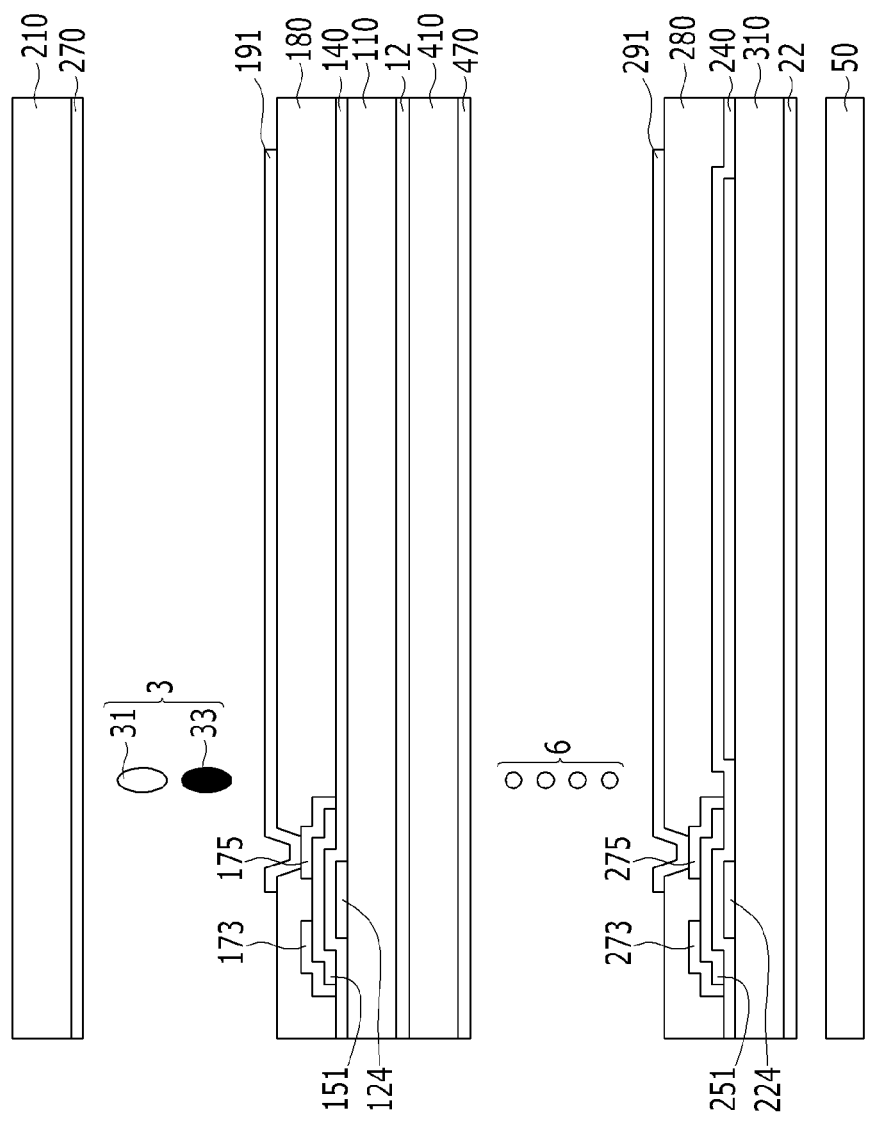
FIG. 18 is a cross-sectional view of another exemplary embodiment of a transflective liquid crystal display according to the invention.

FIG. 18 is a cross-sectional view of a transflective liquid crystal display according to the invention.

The transflective liquid crystal display of FIG. 18 includes the liquid crystal panel including the lower panel including the first substrate 110, the upper panel including the second substrate 210, and the liquid crystal layer 3 between the lower and upper panels. The first and second substrates 110 and 210 are arranged to face each other. The transflective liquid crystal display further includes an auxiliary liquid crystal panel including a third substrate 310, a fourth substrate 410, and an auxiliary liquid crystal layer 6 between the third and fourth substrates 310 and 410.

Although it is not illustrated, first gate lines, first data lines, and a first thin film transistor are on the first substrate 110. In one exemplary embodiment, the first gate lines and the first data lines cross each other and define a plurality of pixels, but the invention is not limited thereto. The first thin film transistor includes the first gate electrode 124 on the first substrate 110, the first gate insulating layer 140 on the first gate electrode 124, the first semiconductor layer 151 on the first gate insulating layer 140, the first source electrode 173, and the first drain electrode 175. The first source electrode 173 and the first drain electrode 175 are at a distance from each other on the first semiconductor layer 151. The first passivation layer 180 is on the first source electrode 173 and the first drain electrode 175, and the first pixel electrode 191 is in a pixel and on the first passivation layer 180.

A first common electrode 270 is on the second substrate 210. Since the first substrate 110 and the second substrate 210 are arranged to face each other, a vertical electric field may be formed between the first pixel electrode 191 and the first common electrode 270 when a voltage is applied to the first pixel electrode 191 and the first common electrode 270.

The liquid crystal layer 3 includes a mixture of a plurality of the liquid crystal molecules 31 and the dichroic dye 33. In this case, the liquid crystal layer 3 is arranged in a direction perpendicular to the first substrate 110 and the second substrate 210.

Although it is not shown, second gate lines, second data lines, and a second thin film transistor connected to the second gate line and the second data line are on the third substrate 310 of the auxiliary liquid crystal panel. In one exemplary embodiment, the second gate lines and the second data lines cross each other and define a plurality of pixels, but the invention is not limited thereto. The second thin film transistor includes the second gate electrode 224 on the third substrate 310, the second gate insulating layer 240 on the second gate electrode 224, the second semiconductor layer 251 on the second gate insulating layer 240, the second source electrode 273, and the second drain electrode 275. The second source electrode 273 and the second drain electrode 275 are at a distance from each other on the second semiconductor layer 251. The second passivation layer 280 is on the second source electrode 273 and the second drain electrode 275, and the second pixel electrode 291 is in a pixel and on the second passivation layer 280.

A second common electrode 470 is on the fourth substrate 410 of the auxiliary liquid crystal panel. Since the third substrate 310 is arranged to face the fourth substrate 410, a vertical electric field may be formed between the second pixel electrode 291 and the second common electrode 470 when a voltage is applied to the second pixel electrode 291 and the second common electrode 470.

The auxiliary liquid crystal layer 6 is arranged in a direction that is parallel with the third substrate 310 and the fourth substrate 410.

The reflection polarizer 12 and the absorption polarizer 22 are formed on outer sides of the liquid crystal panel and the auxiliary liquid crystal panel. In further detail, the reflection polarizer 12 may be attached between the liquid crystal panel and the auxiliary liquid crystal panel, that is, directly between the first substrate 110 and the fourth substrate 410. Further, the absorption polarizer 22 may be attached to an outer side of the auxiliary liquid crystal panel, that is, directly on an outer side of the third substrate 310.

The backlight unit 50 is at the outer side of the auxiliary liquid crystal panel, that is, the outer side of the third substrate 310. In this case, the absorption polarizer 22 is disposed between the third substrate 310 of the auxiliary liquid crystal panel and the backlight unit 50. The backlight unit 50 supplies light to the inside of the auxiliary liquid crystal panel, and the supplied light emits to the outer side of the auxiliary liquid crystal panel, more particularly, to an outer side of the fourth substrate 410, and then enters to the inner side of the liquid crystal panel, more particularly, to an inner side of the first substrate 110. The light supplied to the inner side of the liquid crystal panel is emitted to the outer side of the liquid crystal panel. More particularly, the light is emitted to the outer side of the second substrate 210 and expressed in the screen of the transflective liquid crystal display.

Mechanisms for expressing a black gray and a white gray in a reflection mode and a transmission mode of the transflective liquid crystal display of FIG. 18 will be respectively described.

Figure 19:
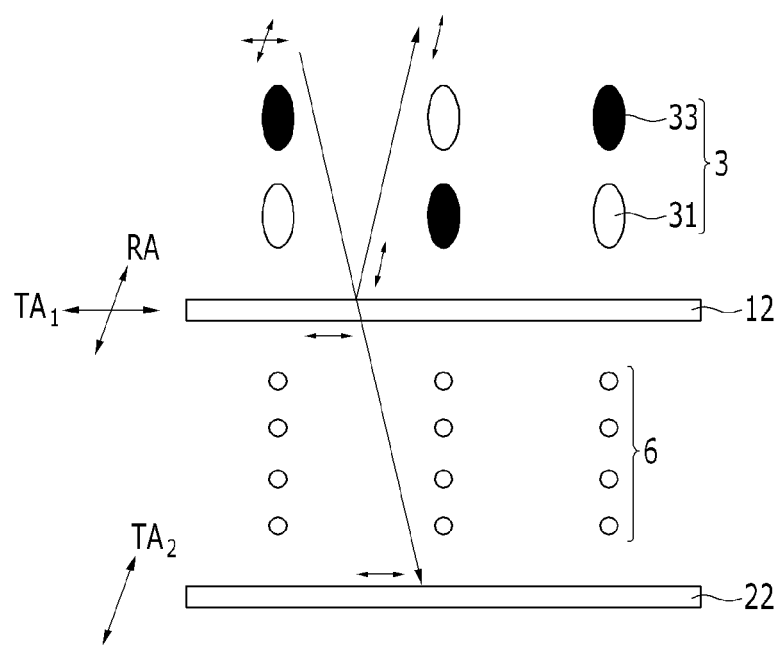
FIG. 19 and FIG. 20 show a driving mechanism of a reflection mode of the transflective liquid crystal display of FIG. 18.
Figure 20:
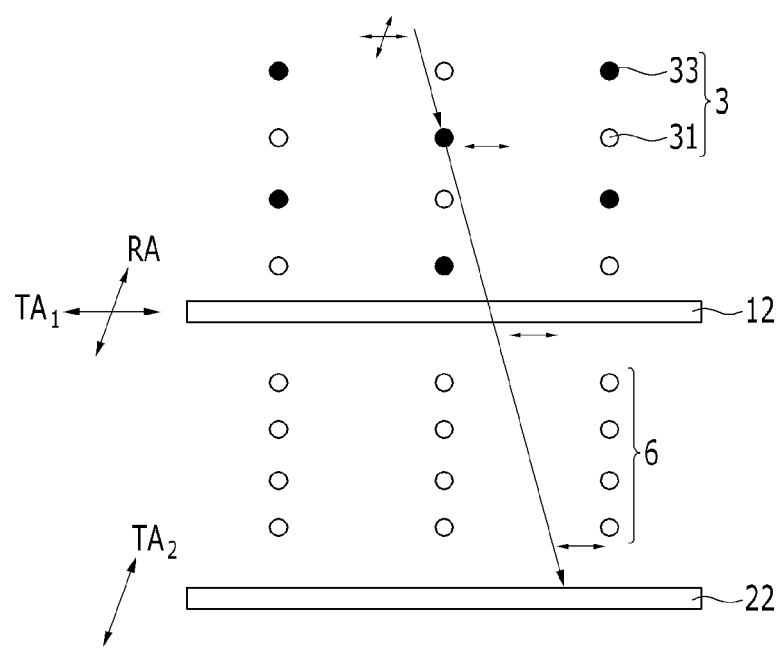
Figure 21:
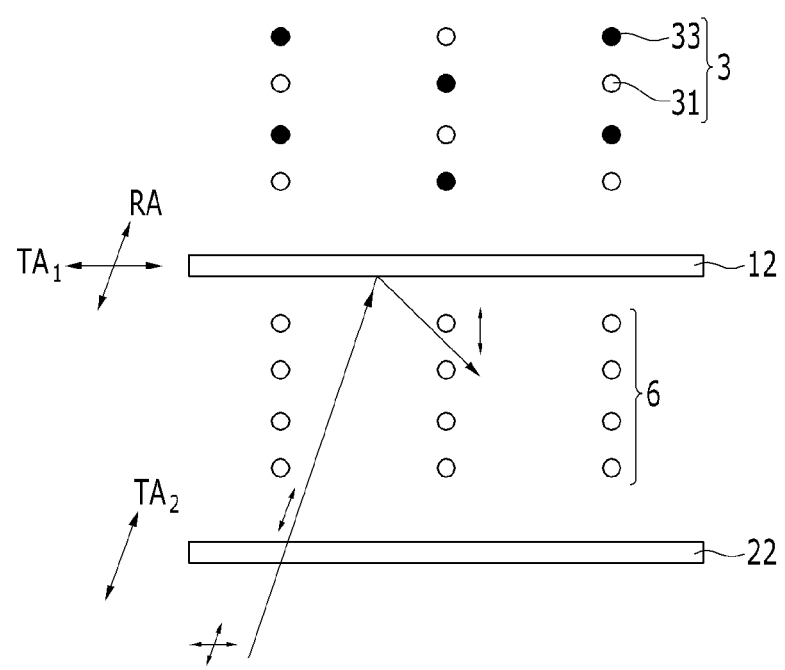
FIG. 21 and FIG. 22 show a driving mechanism of a transmission mode of the transflective liquid crystal display of FIG. 18.
Figure 22:
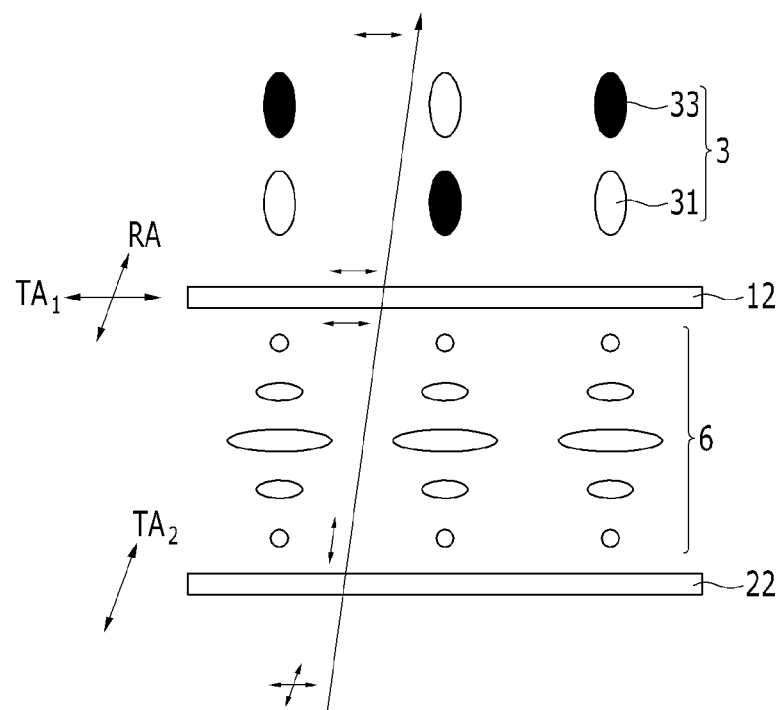

FIG. 19 and FIG. 20 show a driving mechanism of the reflection mode of the transflective liquid crystal display of FIG. 18, and FIG. 21 and FIG. 22 show a driving mechanism of the transmission mode of the transflective liquid crystal display of FIG. 18.

The reflection polarizer 12 of the transflective liquid crystal display of FIG. 18 has a reflective axis RA reflecting light that vibrates in a first direction, and a transmissive axis $TA_1$ transmitting light that vibrates in a second direction that is substantially perpendicular to the first direction. The absorption polarizer 22 further has a transmissive axis $TA_2$ that transmits light vibrating in the first direction. Thus, the reflective axis RA of the reflection polarizer 12 is parallel with the transmissive axis $TA_2$ of the absorption polarizer 22, and the transmissive axis $TA_1$ of the reflection polarizer 12 is perpendicular to the transmissive axis $TA_2$ of the absorption polarizer 22.

The liquid crystal panel 3 is arranged in a direction that is perpendicular to the reflection polarizer 12, and the auxiliary liquid crystal layer 6 of the auxiliary liquid crystal panel is arranged in a direction that is parallel with the reflection polarizer 12.

Referring to FIG. 19, in a reflection mode, when light vibrating in first and second directions enters from the outside, light entering into the liquid crystal panel passes through the liquid crystal layer 3 without phase variation in the state in which no electric field is formed either in the liquid crystal panel or in the auxiliary liquid crystal panel. In this case, since the liquid crystal layer 3 is arranged in the direction that is perpendicular to the reflection polarizer 12, the light vibrating in the first and second directions can reach the reflection polarizer 12 without being absorbed by the dichroic dye 33.

Among the light reaching the reflection polarizer 12, light vibrating in the second direction that is parallel with the transmissive axis $TA_1$ of the reflection polarizer 12 passes through the reflection polarizer 12 and then reaches the absorption polarizer 22, and the light vibrates in the direction that is perpendicular to the transmissive axis $TA_2$ of the absorption polarizer 22 and therefore it is absorbed by the absorption polarizer 22. Among the light reaching the reflection polarizer 12, light vibrating in the first direction that is parallel with the reflective axis RA of the reflection polarizer 12 is reflected by the reflection polarizer 12 and thus expressed to the outside of the liquid crystal panel. Accordingly, when no electric field is formed in the liquid crystal panel and the auxiliary liquid crystal panel, a white gray can be expressed.

Referring to FIG. 20, in the reflection mode, when light vibrating in the first and second directions enters from the outside and a voltage is applied to a first pixel electrode 191 of FIG. 18 and a common electrode 270 of FIG. 18 of the liquid crystal panel and thus a vertical electric field is formed, the liquid crystal layer 3 is arranged in a direction that is parallel with the reflective axis RA of the reflection polarizer 12 so that light vibrating in the first direction that is parallel with the dichroic dye 33 is absorbed by the dichroic dye 33, and light vibrating in the second direction that is parallel with the transmissive axis $TA_1$ of the reflection polarizer 12 passes through the reflection polarizer 12.

In the auxiliary liquid crystal panel, the light having passed through the reflection polarizer 12 reaches the absorption polarizer 22 without phase variation in the state in which no electric field is formed, and the light vibrates in a direction that is perpendicular to the transmissive axis $TA_2$ of the absorption polarizer 22 and therefore it is absorbed by the absorption polarizer 22. Accordingly, when a vertical electric field is formed in the liquid crystal panel in the reflection mode, a black gray can be expressed.

Referring to FIG. 21, in a transmission mode, when light vibrating in the first and second directions enters from the backlight unit 50, only light vibrating in the first direction that is parallel with the transmissive axis $TA_2$ of the absorption polarizer 22 passes through the absorption polarizer 22, and light vibrating in the second direction is absorbed by the absorption polarizer 22. In the state in which no electric field is formed in the auxiliary liquid crystal panel, the light having passed through the absorption polarizer 22 passes through the auxiliary liquid crystal layer 6 without phase variation and then reaches the reflection polarizer 12. Since the light reaching the reflection polarizer 12 is vibrating in the first direction that is parallel with the reflective axis RA of the reflection polarizer 12, the light is reflected by the reflection polarizer 12 and thus the light cannot enter into the liquid crystal panel. Accordingly, in the transmission mode, when no electric field is formed in the auxiliary liquid crystal panel, a black gray can be expressed.

In this case, a voltage is applied to the first pixel electrode 191 of FIG. 18 and the first common electrode 270 of FIG. 18 in the liquid crystal panel and thus a vertical electric field is formed, and the liquid crystal layer 3 is arranged in a direction that is parallel with the reflective axis RA of the reflection polarizer 12. Therefore, light entering from the outside cannot be emitted to the outside in the reflection mode so that a black gray can be expressed. That is, when expressing the black gray in the transmission mode, the black gray is also expressed in the reflection mode when the vertical electric field is formed in the liquid crystal panel so that gray inversion can be reduced or effectively prevented.

Referring to FIG. 22, in the transmission mode, when light vibrating in the first and second directions enters from the backlight unit 50, only light vibrating in the first direction that is parallel with the transmissive axis $TA_2$ of the absorption polarizer 22 passes through the absorption polarizer 22 and light vibrating in the second direction is absorbed by the absorption polarizer 22. When a voltage is applied to a second electrode 291 of FIG. 18 and a second common electrode 470 of FIG. 18 of the auxiliary liquid crystal panel and thus a vertical electric field is formed, the auxiliary liquid crystal layer 6 rotates and the light having passed through the auxiliary liquid crystal layer 6 is changed 90 degrees. Thus, the light having passed through the auxiliary liquid crystal layer 6 vibrates in the second direction that is parallel with the transmissive axis $TA_1$ of the reflection polarizer 12, and therefore the light can pass through the reflection polarizer 12.

In the state in which no electric field is formed in the liquid crystal panel, the light having passed through the reflection polarizer 12 passes through the liquid crystal layer 3 without phase variation, and the liquid crystal layer 3 is arranged in a direction that is perpendicular to the reflection polarizer 12 so that the light vibrating in the second direction is expressed to the outside of the liquid crystal panel without being absorbed by the dichroic dye 33. Accordingly, when an electric field is not formed in the liquid crystal panel and a vertical electric field is formed in the auxiliary liquid crystal panel in the transmission mode, a white gray can be expressed.

When a white gray is expressed in the transmission mode, the white gray is also expressed in the reflection mode so that gray inversion can be reduced or effectively prevented.

Another exemplary embodiment of a transflective liquid crystal display according to the invention will now be described with reference to the accompanying drawings.

Figure 23:
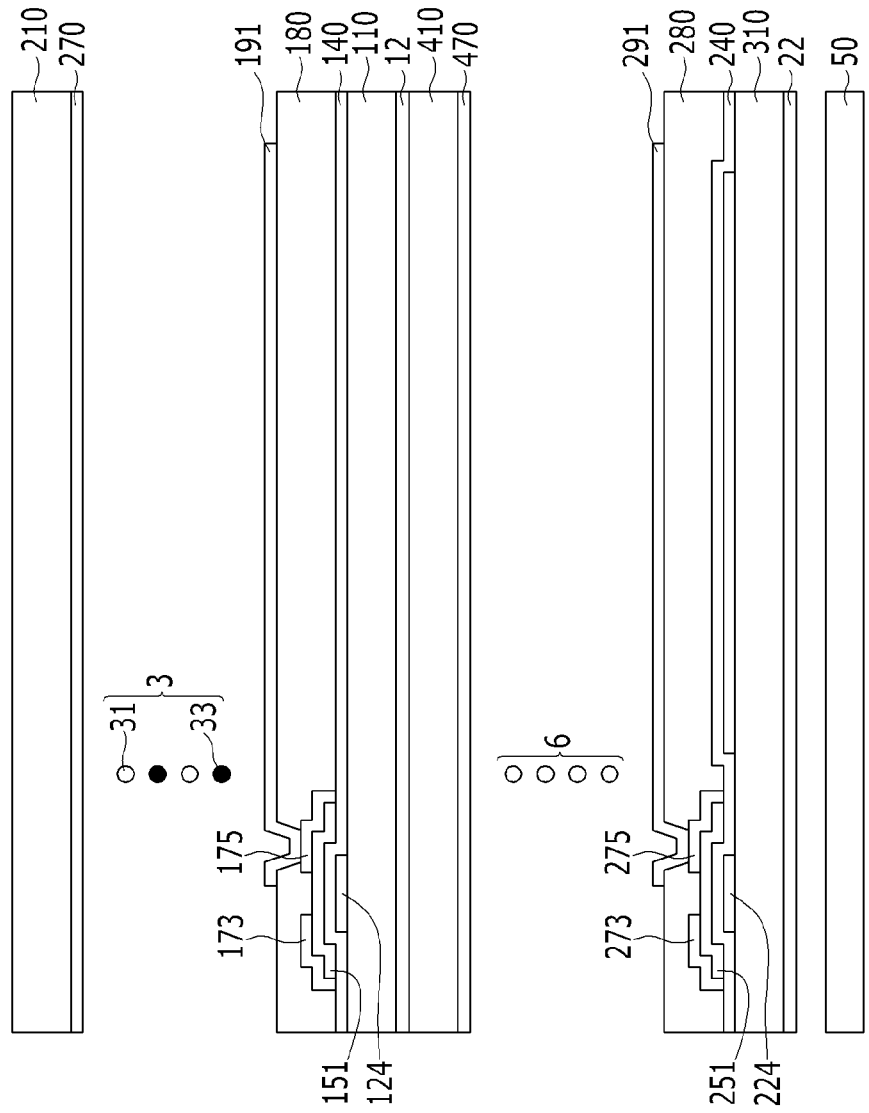
FIG. 23 is a cross-sectional view of another exemplary embodiment of a transflective liquid crystal display according to the invention.

FIG. 23 is a cross-sectional view of another exemplary embodiment of a transflective liquid crystal display according to the invention.

The transflective liquid crystal display of FIG. 23 is similar to the transflective liquid crystal display of FIG. 18, and therefore different parts from the exemplary embodiment in FIG. 18 will be described.

Like the transflective liquid crystal display in FIG. 18, the transflective liquid crystal display of FIG. 23 includes the liquid crystal panel including the first substrate 110, the second substrate 210, and the liquid crystal layer 3 between the first and second substrates 110 and 210, and the auxiliary crystal display panel including the third substrate 310, the fourth substrate 410, and the auxiliary liquid crystal layer 6 between the third and fourth substrates 310 and 410. The first and second substrates 110 and 210 are arranged to face each other, and the third and fourth substrates 310 and 410 are arranged to face each other.

However, the liquid crystal layer 3 is arranged in the vertical direction in FIG. 18, but the liquid crystal layer 3 in FIG. 23 is arranged in a direction that is parallel with the first and second substrates 110 and 210.

The auxiliary liquid crystal layer 6, the reflection polarizer 12, the absorption polarizer 22, and the backlight unit 50 are the same as those of FIG. 18.

Mechanisms for expressing a black gray and a white gray in a reflection mode and a transmission mode of the transflective liquid crystal display of FIG. 23 will be respectively described.

Figure 24:
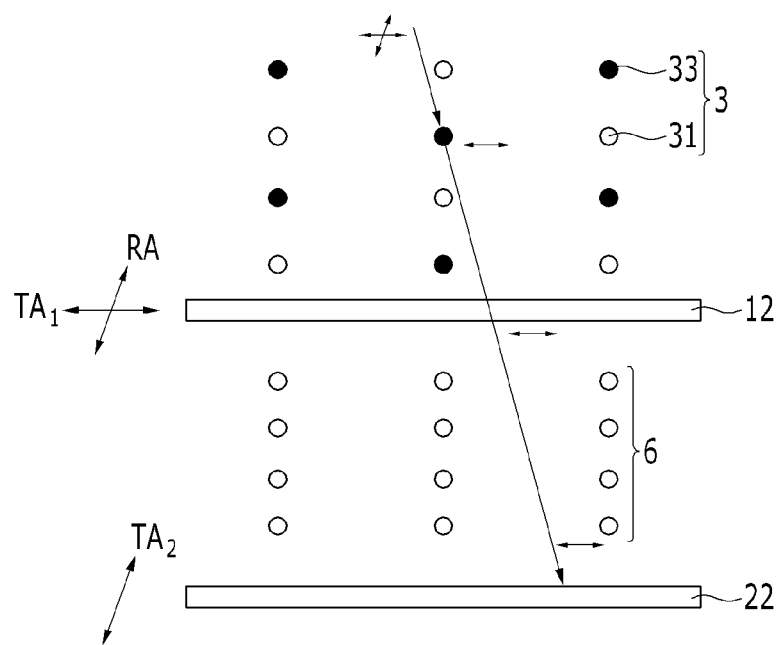
FIG. 24 and FIG. 25 show a driving mechanism of a reflection mode of the transflective liquid crystal display of FIG. 23.
Figure 25:
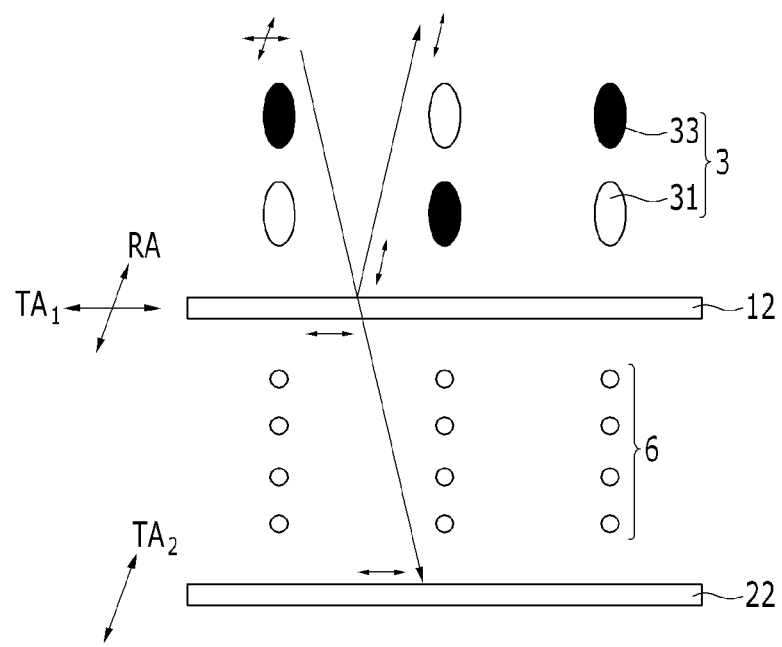
Figure 26:
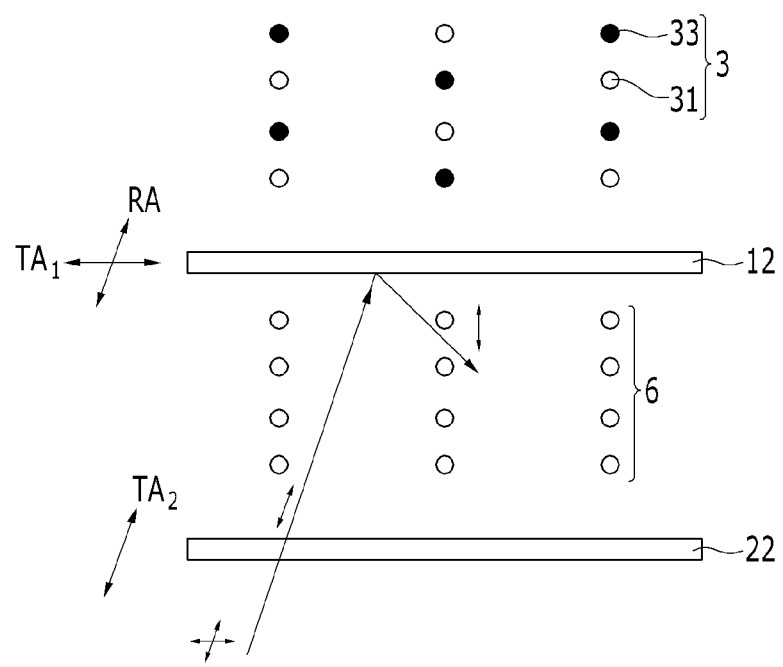
FIG. 26 and FIG. 27 show a driving mechanism of a transmission mode of the transflective liquid crystal display of FIG. 23.
Figure 27:
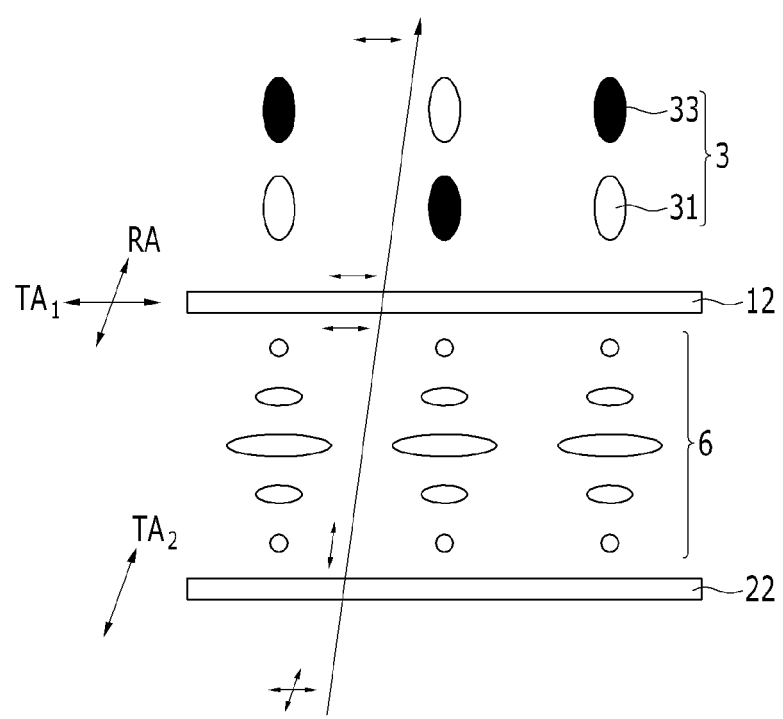

FIG. 24 and FIG. 25 show a driving mechanism of the reflection mode of the transflective liquid crystal display of FIG. 23, and FIG. 26 and FIG. 27 show a driving mechanism of the transmission mode of the transflective liquid crystal display of FIG. 23.

The reflection polarizer 12 of the transflective liquid crystal display of FIG. 23 has a reflective axis RA reflecting light that vibrates in a first direction, and a transmissive axis $TA_1$ transmitting light that vibrates in a second direction that is substantially perpendicular to the first direction. The absorption polarizer 22 further has a transmissive axis $TA_2$ that transmits light vibrating in the first direction. Thus, the reflective axis RA of the reflection polarizer 12 is parallel with the transmissive axis $TA_2$ of the absorption polarizer 22, and the transmissive axis $TA_1$ of the reflection polarizer 12 is perpendicular to the transmissive axis $TA_2$ of the absorption polarizer 22.

The liquid crystal panel 3 is arranged in a direction that is parallel with to the reflection polarizer 12, and the auxiliary liquid crystal layer 6 of the auxiliary liquid crystal panel is arranged in a direction that is parallel with the reflection polarizer 12.

Referring to FIG. 24, light vibrating in the first and second directions enters from the outside in the reflection mode, and light having entered into the liquid crystal panel passes through the liquid crystal layer 3 without phase variation in the state in which no electric field is formed in the liquid crystal panel and the auxiliary liquid crystal panel. In this case, since the liquid crystal layer 3 is arranged in a direction that is parallel with the reflective axis RA of the reflection polarizer 12, light vibrating in the first direction that is parallel with the dichroic dye 33 is absorbed by the dichroic dye 33 and light vibrating in the second direction that is parallel with the transmissive axis $TA_1$ of the reflection polarizer 12 passes through the reflection polarizer 12. The light having passed through the reflection polarizer 12 reaches the absorption polarizer 22 without phase variation, and the light vibrates in a direction that is perpendicular to the transmissive axis $TA_2$ of the absorption polarizer 22 so that the light is absorbed by the absorption polarizer 22. Accordingly, a black gray can be expressed in the reflection mode when no electric field is formed in the liquid crystal panel and the auxiliary liquid crystal panel.

Referring to FIG. 25, in the reflection mode, when light vibrating in the first and second directions enters from the outside, a voltage is applied to a first pixel electrode 191 of FIG. 23 and a first common electrode 270 of FIG. 23 of the liquid crystal panel and a vertical electric field is formed, and the liquid crystal layer 3 is arranged in a direction perpendicular to the reflection polarizer 12 so that the light vibrating in the first and second directions can reach the reflection polarizer 12 without being absorbed by the dichroic dye 33. Among the light reaching the reflection polarizer 12, light vibrating in the second direction that is parallel with a transmissive axis $TA_1$ of the reflection polarizer 12 passes through the reflection polarizer 12 in the state in which no electric field is formed in the auxiliary liquid crystal panel and then reaches the absorption polarizer 22. Since the light reaching the absorption polarizer 22 vibrates in the second direction that is perpendicular to a transmissive axis $TA_2$ of the absorption polarizer 22, the light is absorbed by the absorption polarizer 22. Among the light reaching the reflection polarizer 12, light vibrating in the first direction that is parallel with a reflective axis RA of the reflection polarizer 12 is reflected by the reflection polarizer 12 and then expressed to the outside of the liquid crystal panel. Accordingly, when a vertical field is formed in the liquid crystal panel in the reflection mode, a white gray can be expressed.

Referring to FIG. 26, in a transmission mode, when light vibrating in the first and second directions enters from the backlight unit 50, only light vibrating in the first direction that is parallel with the transmissive axis TA2 of the absorption polarizer 22 passes through the absorption polarizer 22, and light vibrating in the second direction is absorbed by the absorption polarizer 22. In the state in which no electric field is formed in the auxiliary liquid crystal panel, the light having passed through the absorption polarizer 22 passes through the auxiliary liquid crystal layer 6 without phase variation and then reaches the reflection polarizer 12. Since the light reaching the reflection polarizer 12 vibrates in the first direction that is parallel with the reflective axis RA of the reflection polarizer 12, the light is reflected by the reflection polarizer 12 so that the light cannot enter into the liquid crystal panel. Accordingly, when no electric field is formed in the auxiliary crystal display panel in the transmission mode, a black gray can be expressed.

When expressing the black gray in the transmission mode, the black gray is also expressed in the reflection mode if no electric field is formed in the liquid crystal panel so that gray inversion can be reduced or effectively prevented.

Referring to FIG. 27, in the transmission mode, when light vibrating in the first and second directions enters from the backlight unit 50, only light vibrating in the first direction that is parallel with the transmissive axis $TA_2$ of the absorption polarizer 22 passes through the absorption polarizer 22, and light vibrating in the second direction is absorbed by the absorption polarizer 22. When a voltage is applied to a second electrode 291 of FIG. 23 and a second common electrode 470 of FIG. 23 in the auxiliary liquid crystal panel and a vertical electric field is formed, the auxiliary liquid crystal layer 6 rotates and the phase of the light having passed through the absorption polarizer 22 is changed 90 degrees. Thus, since the light having passed through the auxiliary liquid crystal layer 6 vibrates in the second direction that is parallel with the transmissive axis $TA_1$ of the reflection polarizer 12, the light passes through the reflection polarizer 12.

When a voltage is applied to a first pixel electrode 191 of FIG. 23 and a common electrode 270 of FIG. 23 in the liquid crystal panel and thus a vertical electric field is formed, the liquid crystal layer 3 is arranged in a direction that is perpendicular to the reflection polarizer 12 and thus light is expressed to the outside of the liquid crystal panel without being absorbed by the dichroic dye 33. Accordingly, a white gray can be expressed in the transmission mode when a vertical electric field is formed in the liquid crystal panel and the auxiliary liquid crystal panel.

When a white gray is expressed in the transmission mode, the white gray is also expressed in the reflection mode so that gray inversion can be reduced or effectively prevented.

The transflective liquid crystal displays of FIGS. 18 to 22 and 23 to 27 are exemplary embodiments in which the transflective liquid crystal displays of FIGS. 1 to 5, 8 to 12 and 13 to 17 can be realized using two liquid crystal panels.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A transflective liquid crystal display comprising:
  a liquid crystal panel comprising
    a first substrate, a first pixel electrode in a pixel on the first substrate, and a common electrode on the first substrate,
    a second substrate, and a second pixel electrode in a pixel on the second substrate, and
    a liquid crystal layer, the first and second substrates face each other, and the liquid crystal layer is between the first and second substrates;
  a reflection polarizer and an absorption polarizer at opposing outer sides of the liquid crystal panel; and
  a backlight unit at an outer side of the liquid crystal panel, and supplying light to an inside of the liquid crystal panel,
  wherein
  a reflective axis of the reflection polarizer is parallel with a transmissive axis of the absorption polarizer,
  a transmissive axis of the reflection polarizer is perpendicular to the transmissive axis of the absorption polarizer, and
  the liquid crystal layer includes liquid crystal molecules and a dichroic dye.

2. The transflective liquid crystal display of claim 1, wherein the liquid crystal layer is arranged in a direction which is parallel with the reflective axis of the reflection polarizer.

3. The transflective liquid crystal display of claim 2, wherein when a vertical electric field is formed between the second pixel electrode and the common electrode in a reflection mode, light having entered from an outside of the liquid crystal panel is reflected by the reflection polarizer and then transmitted through the absorption polarizer to the outside of the liquid crystal panel.

4. The transflective liquid crystal display of claim 2, wherein when a horizontal electric field is formed between the first pixel electrode and the common electrode in a transmission mode, light having entered from the backlight unit is phase-delayed in the liquid crystal layer and then transmitted through the absorption polarizer to an outside of the liquid crystal panel.

5. The transflective liquid crystal display of claim 1, wherein the liquid crystal layer is arranged in a direction which is perpendicular to the reflection polarizer.

6. The transflective liquid crystal display of claim 5, wherein when a horizontal electric field is formed between the first pixel electrode and the common electrode in a reflection mode, the liquid crystal layer is arranged in a direction which is parallel with the reflective axis of the reflection polarizer, and the dichroic dye absorbs light having entered from the outside of the liquid crystal panel.

7. The transflective liquid crystal display of claim 5, wherein, when a vertical electric field is formed between the second pixel electrode and the common electrode in a transmission mode, the liquid crystal layer is arranged in a direction which is parallel with the reflective axis of the reflection polarizer, and the absorption polarizer absorbs light having entered from the backlight unit.

8. The transflective liquid crystal display of claim 5, wherein,
when a horizontal electric field is formed between the first pixel electrode and the common electrode, and a vertical electric field is formed between the second pixel electrode and the common electrode in a transmission mode,
light having entered from the backlight unit is phase-delayed in the liquid crystal layer and then transmitted through the absorption polarizer to an outside of the liquid crystal panel.

9. The transflective liquid crystal display of claim 1, wherein the liquid crystal layer is arranged in a direction which is parallel with the reflective axis of the reflection polarizer in a portion adjacent to the first substrate, and arranged in a direction which is perpendicular to the reflective polarizer at a portion adjacent to the second substrate.

10. The transflective liquid crystal display of claim 9, wherein, when a vertical electric field is formed between the second pixel electrode and the common electrode in a reflection mode, light having entered from an outside of the liquid crystal panel is reflected by the reflection polarizer and then transmitted through the absorption polarizer to the outside of the liquid crystal panel.

11. The transflective liquid crystal display of claim 9, wherein, when a horizontal electric field is formed between the first pixel electrode and the common electrode in a transmission mode, light having entered from the backlight unit is phase-delayed in the liquid crystal layer and then transmitted through the absorption polarizer to an outside of the liquid crystal panel.

12. The transflective liquid crystal display of claim 1, further comprising:
first gate lines and first data lines on the first substrate;
a first thin film transistor connected to the first gate line and the first data line;
second gate lines and second data lines on the second substrate; and
a second thin film transistor connected to the second gate line and the second data line, and
the first pixel electrode is connected to the first thin film transistor, and the second pixel electrode is connected to the second thin film transistor.

13. A transflective liquid crystal display comprising:
a liquid crystal panel comprising:
first and second substrates arranged to face each other; and
a liquid crystal layer between the first and second substrates, and comprising liquid crystal molecules and a dichroic dye;
an auxiliary liquid crystal panel comprising:
third and fourth substrates arranged to face each other; and
an auxiliary liquid crystal layer between the third and fourth substrates, and
a backlight unit at an outer side of the liquid crystal panel, and supplying light to an inside of the auxiliary liquid crystal panel,
wherein
a reflective axis of the reflection polarizer is parallel with a transmissive axis of the absorption polarizer,
a transmissive axis of the reflection polarizer is perpendicular to the transmissive axis of the absorption polarizer,
the reflection polarizer is between the liquid crystal panel and the auxiliary liquid crystal panel, and
the absorption polarizer is between the auxiliary liquid crystal panel and the backlight unit.

14. The transflective liquid crystal display of claim 13, wherein the liquid crystal panel and the auxiliary liquid crystal panel respectively comprise a plurality of pixels, and further comprise:
a first pixel electrode in a pixel on the first substrate;
a first common electrode on the second substrate;
a second pixel electrode in a pixel on the third substrate; and
a second common electrode on the fourth substrate.

15. The transflective liquid crystal display of claim 14, wherein
the liquid crystal layer is arranged in a direction which is perpendicular to the reflection polarizer, and
the auxiliary liquid crystal layer is arranged in a direction which is parallel with the reflection polarizer.

16. The transflective liquid crystal display of claim 14, wherein when a vertical electric field is formed between the first pixel electrode and the first common electrode in a reflection mode, the liquid crystal layer is arranged in a direction which is parallel with the reflective axis of the reflection polarizer, and the dichroic dye absorbs light having entered from an outside of the liquid crystal panel.

17. The transflective liquid crystal display of claim 15, wherein when a vertical electric field is formed between the first pixel electrode and the first common electrode in a transmission mode, light having entered from the backlight unit is reflected by the reflection polarizer.

18. The transflective liquid crystal display of claim 15, wherein when a vertical electric field is formed between the second pixel electrode and the second common electrode in a transmission mode, light having entered from the backlight unit is phase-delayed in the auxiliary liquid crystal layer and then transmitted through the reflection polarizer and to an outside of the liquid crystal panel.

19. The transflective liquid crystal display of claim 14, wherein
the liquid crystal layer is arranged in a direction which is parallel with the reflective axis of the reflection polarizer, and the auxiliary liquid crystal layer is arranged in a direction which is parallel with the reflection polarizer.

20. The transflective liquid crystal display of claim 19, wherein, when a vertical electric field is formed between the first pixel electrode and the first common electrode in a reflection mode, light having entered from an outside of the liquid crystal panel is reflected by the reflection polarizer and then transmitted to the outside of the liquid crystal panel.

21. The transflective liquid crystal display of claim 19, wherein
- when a vertical electric field is formed between the first pixel electrode and the first common electrode in a transmission mode, and a vertical electric field is formed between the second pixel electrode and the second common electrode,
- light having entered from the backlight unit is phase-delayed in the auxiliary liquid crystal layer and then transmitted through the reflection polarizer to an outside of the liquid crystal panel.

22. The transflective liquid crystal display of claim 14, further comprising:
- first gate lines and first data lines on the first substrate;
- a first thin film transistor connected to the first gate line and the first data line;
- second gate lines and second data lines on the third substrate; and
- a second thin film transistor connected to the second gate line and the second data line,
- wherein the first pixel electrode is connected to the first thin film transistor and the second pixel electrode is connected to the second thin film transistor.

\* \* \* \* \*